United States Patent [19]

Sun et al.

[11] 4,332,167
[45] Jun. 1, 1982

[54] METHOD OF MAKING AN RF ADMITTANCE MEASURING PROBE AND PRODUCT THEREOF

[75] Inventors: Robert J. Sun, Bala Cynwyd; Frederick L. Maltby, Jenkintown, both of Pa.

[73] Assignee: Drexelbrook Controls, Inc., Horsham, Pa.

[21] Appl. No.: 22,456

[22] Filed: Mar. 21, 1979

Related U.S. Application Data

[63] Continuation of Ser. No. 635,595, Nov. 28, 1975, abandoned, which is a continuation-in-part of Ser. No. 532,208, Dec. 12, 1974, Pat. No. 4,064,753.

[51] Int. Cl.³ .................. B29C 27/30; B29D 3/00; G01F 23/26
[52] U.S. Cl. .................. 73/304 C; 156/52; 156/285; 264/102; 264/249; 264/313; 264/DIG. 78; 324/61 P; 324/65 P; 340/620; 361/284
[58] Field of Search .................. 73/304 C; 324/61 P, 324/65 P, 65 CP, 61 R, 71 R, 158 P, 60 C; 361/284, 285, 291, 292; 264/102, 249, 248, 272, 273, 101, 127, DIG. 78, 313; 156/52, 285; 340/612, 620; 428/256

[56] References Cited

U.S. PATENT DOCUMENTS

| | | | |
|---|---|---|---|
| 1,560,862 | 11/1925 | Roberts | 264/DIG. 78 |
| 2,852,937 | 9/1958 | Maze | 73/304 |
| 3,030,255 | 4/1962 | Winston | 264/273 |
| 3,091,176 | 5/1963 | Wall | 264/273 |
| 3,269,180 | 8/1966 | Schreiber | 324/61 R |
| 3,324,647 | 6/1967 | Jedynak | |
| 3,335,344 | 8/1967 | Kling | 73/304 C |
| 3,437,924 | 4/1969 | Tocanne | 324/61 P |
| 3,519,530 | 7/1970 | Struble | 156/264 |
| 3,627,613 | 12/1971 | Stolki | 428/256 |
| 3,706,980 | 12/1972 | Maltby | 340/244 C |
| 3,729,994 | 5/1973 | Klug | 73/194 E |
| 3,746,975 | 7/1973 | Maltby | 324/65 R |
| 3,781,672 | 12/1973 | Maltby et al. | 324/61 R |

FOREIGN PATENT DOCUMENTS

| | | | |
|---|---|---|---|
| 316134 | 10/1930 | United Kingdom | 156/286 |
| 441576 | 1/1936 | United Kingdom | 73/304 C |
| 819712 | 9/1959 | United Kingdom | 73/304 |
| 848608 | 9/1960 | United Kingdom | 156/286 |

OTHER PUBLICATIONS

Anon. Mod. Plastics Encyclopedia (1976–1977), pp. 460–461.

*Primary Examiner*—W. E. Hoag
*Attorney, Agent, or Firm*—Woodcock, Washburn, Kurtz, Mackiewicz & Norris

[57] ABSTRACT

An RF probe and method for making same including laminating sheets of thermoplastic insulation to both sides of a layer of wire screen which is evacuated and pressure thereafter applied by fluid pressure acting on a diaphragm pressing member.

14 Claims, 53 Drawing Figures

METHOD OF MAKING AN RF ADMITTANCE MEASURING PROBE AND PRODUCT THEREOF

RELATED APPLICATIONS

This is a continuation of application Ser. No. 635,595, filed Nov. 28, 1975, now abandoned; and which is a continuation-in-part of Ser. No. 532,208, filed Dec. 12, 1974, now U.S. Pat. No. 4,064,753.

BACKGROUND OF THE INVENTION

This invention relates to an improved method and apparatus for the RF measurement of conductive liquid levels in a vessel, and in particular, to the measurement of flow rates through flow channels by measuring the level of the conductive liquid in a flow channel such as a flume or weir.

U.S. Pat. No. 3,269,180 to Schreiber discloses a sensing element or probe for measuring the flow rate through a flow channel. In order to properly correlate the flow rate with the head height level of liquid in the flow channel, the probe electrode of the Schreiber patent is characterized such that connection of the probe to an appropriate electronic unit will produce an output which is linear with the flow rate.

In probe electrodes of the type shown in the Schreiber patent, accumulation of a coating is a very substantial problem. For example, if the coating accumulates on the probe of FIG. 1b where the conductive backing or guard shield is connected to ground, the capacitance of the coating will be resistively coupled around the sides of the probe to ground thereby producing an erroneous reading of the head height and thus the flow rate.

Another very significant problem with probes of this type is that water or other conductive fluids flowing through the channel will permeate the insulation of the probe and this permeation is greatly increased with the temperature of the liquid if the bond between the probe electrode and the insulation is not tight, the liquid will permeate the insulation and delaminate the probe electrode and insulation. This in turn creates voids or air gaps at the electrode which will adversely affect the level measurements and create distortion and curling of the probe.

In U.S. Pat. Nos. 3,781,672 to Maltby et al and 3,706,980 to Maltby, both of which are assigned to the assignee of this invention, systems are disclosed for immunizing capacitance measuring probes from the effects of coatings. This is accomplished by providing a guard shield which is exposed to the materials being measured and driven at the same potential as the probe electrode so as to maintain the accumulated coating at substantially the same potential as the probe electrode and thereby eliminating its effects on any capacitance measurement. However, the guard element of FIGS. 1b and 1f of the Schreiber patent could not be driven at the same potential as the probe electrode where the probes are mounted on the wall or an otherwise grounded support member of the flow channel since the guard element would be grounded. Even if it could be driven at the potential of the probe electrode, this would not eliminate the adverse effects of the coating since the driven guard electrode which is at the rear of the probe would not be closely coupled to the coating at the front of the probe due to the presence of a rather thick insulation from back-to-front of the probe. As a result, the capacitance of the coating would be resistively coupled to the wall of the flow channel which is effectively coupled to ground through the conductive liquid in the flow channel and would thereby enter into the capacitance measurement.

U.S. Pat. No. 3,729,994 to Klug, like the Schreiber patent, discloses a curved and characterized probe for measuring the flow rates through a flow channel. However, unlike the Schreiber patent, the Klug patent does not disclose a conductive backing or a guard electrode of any kind other than a dielectric medium intended to immunize the probe electrode from any changes in capacitance through the rear of the probe. The probe electrode is insulated from the conductive liquid within the flow channel at the front of the probe by Teflon, presumably of sufficient thickness so as to avoid "cut-through" by the materials and debris flowing in the flow channel. However, Teflon has a relatively low dielectric constant of approximately 2.2 which would provide less than the optimal capacitive coupling of any coating to a guard electrode if a sufficient Teflon thickness were utilized to avoid "cut-through".

The Klug patent also discloses a probe electrode comprising a metallic woven wire mesh which is embedded in a polyester reinforced fiberglass conduit. Typically, the probe electrode would be embedded in the fiberglass while the fiberglass is in a liquid state (as by a spray-on process) and there would be no heat curing of the probe. As a result, the bond or lack of a bond between the mesh and the fiberglass permits the formation of tiny voids which collect water. The nature of the mesh is not specified, e.g., the gauge of the mesh and size of the openings are not specified.

U.S. Pat. No. 2,852,937-Maze discloses a probe adapted to be mounted on the wall of a container for measuring the level of a conductive liquid within the container. The probe includes a probe electrode and a shield electrode located behind and extending somewhat laterally outwardly beyond the lateral extremities of the probe electrode. However, the shield electrode is not closely capacitively coupled to the conductive liquid. The insulation itself comprises Teflon which, in combination with the spacing of the shield from the surface of the insulation, substantially precludes any close coupling of a coating to the shield.

U.S. Pat. No. 3,324,647 to Jedynak discloses a pair of isolator plates behind and extending laterally outwardly beyond a probe electrode. There is no suggestion that either of the isolator plates is driven at the same potential as the probe electrode nor is there any suggestion of a close coupling between a coating on the surface of the probe and the isolator plates.

Other prior art techniques involve the use of a mesh embedded in a thermoplastic meterial for use as a conveyor belt.

SUMMARY OF THE INVENTION

It is an object of this invention to provide an improved method and apparatus for measuring the level of a conductive liquid in a vessel or container.

It is a more specific object of this invention to provide an improved method and apparatus for measuring level or flow rates of a conductive liquid or other fluid in a vessel or flow channel such as a weir or flume.

It is a further specific object of this invention to provide an improved method and apparatus for measuring the level of the fluid in a vessel where the measuring probe may be mounted flush with the wall of the vessel so as not to adversely affect or be adversely affected by the flow or movement of the fluid in the vessel.

It is a still further specific object of this invention to provide an improved method and apparatus for measuring the level of the fluid in a vessel where the measuring probe is mounted flush with the wall of the vessel so as not to collect fibrous materials at the probe which may adversely affect the measurement or adversely affect the flow of the fluid.

It is a further object of this invention to provide an improved method and apparatus wherein the probe may be mounted on the wall of the vessel without any adverse effects from an accumulated coating of the fluid on the probe.

It is a further object of this invention to provide an improved method and apparatus wherein the probe generally conforms with the curve at the wall of the vessel or flow channel.

It is also an object of this invention to provide an improved method and apparatus wherein the probe may be readily installed within an existing vessel or flow channel.

It is also an object of this invention to provide an improved method and apparatus wherein changes in the dielectric constant of the insulation material in the measuring probe will not adversely affect the measurement of a conductive liquid level.

It is a further object of this invention to provide an improved method and apparatus wherein the probe is capable of detecting the presence of an unwanted insulating coating on the probe and eliminate the effects of that coating on the level measurement.

It is a further object of this invention to provide an improved method and apparatus wherein the foregoing objects are achieved without sacrificing the ability of the probe to resist the abrading effect of materials which may pass through a flow channel.

It is also an object of this invention to provide an improved method and apparatus wherein a probe may be readily calibrated.

In accordance with these and other objects, an RF probe system includes a probe adapted to be mounted against a surface in a vessel for measuring the level of a substantially conductive liquid therein where the surface when covered with a coating of the liquid is effectively grounded through the conductive liquid. The probe comprises a conductive probe electrode extending longitudinally along the probe adjacent the front thereof and conductive guard electrode means extending longitudinally along the probe. The guard electrode means includes lateral portions extending laterally outwardly beyond the lateral extremities of the probe electrode. Interior solid insulation means are located between and insulate the probe electrode and the rear portion of the guard electrode. Exterior solid insulation means cover the conductive guard electrode means and the conductive probe electrode such that the conductive liquid is closely capacitively coupled to the probe electrode at the lateral portions of the conductive guard electrode means. Preferably, the coupling between the lateral portions of the guard electrode and the conductive liquid is achieved by permitting the lateral portions to extend laterally outwardly a distance of at least six times greater than the thickness of the solid insulation means covering the guard electrode means divided by the dielectric constant of the solid insulation means. The probe system further comprises means for maintaining the potential of the guard electrode means at substantially the same potential as the probe electrode.

In the preferred embodiment of the invention, the guard electrode comprises a rear portion juxtaposed to and disposed behind the probe electrode.

In order to permit the probe to be utilized in measuring the flow rate of the liquid through a flow channel, the probe electrode may be characterized so as to have a frontal lateral dimension increasing with increasing distance from one longitudinal end of the probe. The lateral portions of the guard electrode means then extend laterally outwardly beyond the lateral extremities of the probe electrode a greater distance with decreasing distance from one longitudinal end of the probe.

In accordance with other specific objects of the invention, the system comprises track means having a longitudinal groove for receiving the probe and permitting movement of the probe through the groove. The track which may be flexible can be mounted on the wall or other support member of the vessel or flow channel. In the alternative, the track may be formed within the wall or support member. The track serves the dual function of providing support for a probe which is preferably very thin while also permitting removal of the probe from the vessel for replacement, repair or calibration purposes.

In a particularly preferred embodiment, the track extends along a curved portion of a flow channel such that the probe itself is curved to conform with the curvature in the wall of the flow channel. In order to accommodate this curvature, the probe may comprise a flexible laminated structure which may be formed by appropriately etching a conductive surface on one side of an insulating substrate so as to form the probe electrode and lateral guard electrodes while the conductive surface on the opposite side of the insulating substrate serves as the rear guard electrode. The exterior insulation may comprise two sheets which are heat sealed along the lateral extremities thereof.

In further accordance with the objects of the invention, the exterior insulation means may comprise a high molecular weight polymer of vinylidene fluoride having a dielectric constant in excess of 4 so as to assure close capacitive coupling of a conductive coating at the lateral portions of the guard electrode means while at the same time providing resistance to abrasion in a flow channel.

In further accordance with this invention, the system may comprise adjustable mounting means for use in mounting a probe in various positions on a surface or a wall of the vessel. The mounting means may permit removal of the probe therefrom for calibration purposes and replacement of the probe on the mounting means in a predetermined position. In addition, indicia may be longitudinally placed along the probe under a transparent outer insulation so as to assist in the calibration.

In accordance with certain other objects of the invention, the probe system may comprise means for heating the probe for assisting in the dispersal of a coating such as grease which may build up on the exterior of the probe. The means for heating may comprise the guard electrode itself which may have a generally serpentine shape so as to serve as a resistor. In the alternative, a separate heating element may be utilized at the rear of the probe adjacent the rear potions of the guard electrode means. Where the probe is inserted into the track, the heating means may be sandwiched between the base of the longitudinal groove in the track and the probe.

In accordance with certain other objects of the invention, additional electrode means may be provided in the probe and covered by the exterior insulation for measuring changes in the dielectric constant of the exterior insulation means. Such an additional electrode means in combination with suitable compensating means will eliminate the effects of any change in the dielectric constant of the exterior insulation means on the measurement of the liquid level.

It is a further object of this invention to provide a method and apparatus wherein undesirable voids or air gaps between a probe electrode and insulation of the probe are substantially eliminated.

It is a more specific object of this invention to provide a method and apparatus wherein any delamination between a probe electrode and the probe insulation which would create such air gaps is substantially eliminated.

It is a still more specific object of this invention to provide a method and apparatus wherein the delamination between the probe electrode and the probe insulation is substantially eliminated even when the probe is submerged in hot water for a long period of time.

It is a still further specific object of this invention to provide a method and apparatus wherein a uniformity in the laminated probe is achieved.

It is another specific object of this invention to provide a method and apparatus wherein distortion and curling of the laminated probe are avoided.

In accordance with these and other objects of the invention, the probe comprises conductive probe electrode means extending longitudinally along the probe and having a multiplicity of openings extending through the probe electrode means from one side to the other. Insulation means extend longitudinally along the probe electrode means on opposite sides thereof. The insulation means extends through the openings and applies compressive forces to the electrode means over the surface area thereof.

In accordance with this invention, the compressive forces on the probe electrode means should exceed 100 psi and preferably exceed 500 psi.

In order to obtain the desired compressive forces, the average minimum thickness of the insulation means as measured from the probe electrode means between adjacent openings and the exterior surface of the insulation means is greater than 10% of the average minimum spacing between openings in the probe electrode. Preferably, the average minimum thickness is greater than the average minimum spacing with the maximum compressive forces achieved when the average minimum thickness is at least equal to one-and-one-half the average minimum spacing.

In order to assure the desired compressive forces, the probe electrode means must be surrounded by sufficient insulation. This requires a certain minimum thickness as measured from the probe electrode means to the exterior surface of the insulation means. Similarly, it requires a certain minimum cross-sectional dimension of the openings in the probe electrode means. However, the average maximum cross-sectional dimension of the openings in the probe electrode means should be less than twice the average minimum thickness of the insulation so as to assure the proper fringing effect.

In a particularly preferred embodiment of the invention, the probe electrode comprises a plurality of conductive filaments. These filaments may be woven into a mesh. In another embodiment of the invention, the probe electrode means comprises a sheet of conductive material including a multiplicity of etched openings where the edges of the openings are rounded off.

In order to assure that adequate compressive forces are attained, it is important that the melting point of the insulation material exceeds the operating temperature of the probe. In this connection, a melting temperature in excess of 100° F. is desirable and preferably a temperature in excess of 212° F.

In a particularly preferred embodiment of the invention, the insulation means comprises a thermoplastic material. The thermoplastic material may comprise a fluorocarbon resin which is a crystalline, high molecular weight polymer of vinylidene fluoride having a dielectric constant in excess of 4. When such a thermoplastic material is utilized, the melting temperature will be at least 370° F.

In accordance with another important aspect of the invention, pressure is applied to the insulation material prior to heating to the curing temperature. In a particularly preferred embodiment of the invention, this pressure is achieved by evacuating any air between the insulation means and the probe electrode. The fluid pressure is then applied to the insulation means.

BRIEF DESCRIPTION OF THE DRAWINGS

FIG. 14a is a sectional view of the probe of FIGS. 10 and 11 mounted in a track cast from the wall of the flow channel itself;

DETAILED DESCRIPTION OF THE PREFERRED EMBODIMENTS

Figure 1:
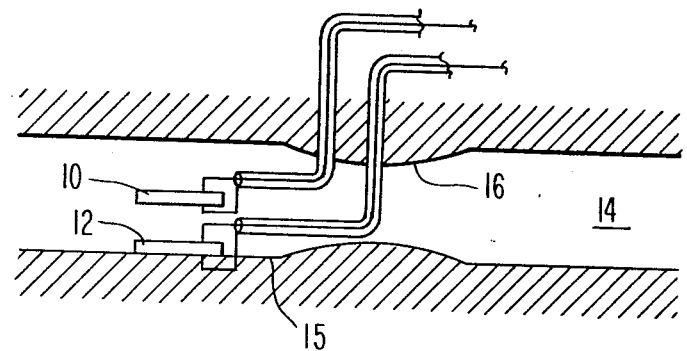
FIG. 1 is a top plan view of a flow channel having a restriction therein with flow rate sensing probes mounted in a channel.
Figure 2:
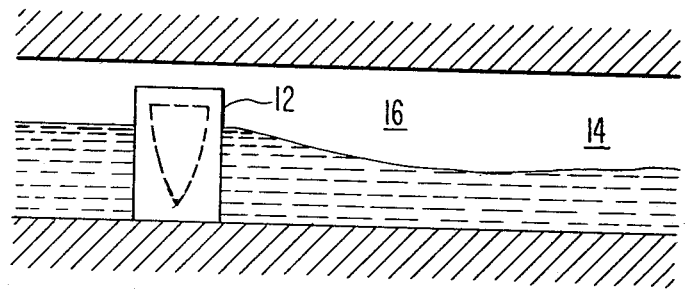
FIG. 2 is a side view of the flow channel of FIG. 1.

As shown in FIGS. 1 and 2, flow rate sensing probes 10 and 12 are mounted with the longitudinal axis of the probe extending vertically into the grounded liquid flowing within a flow channel 14 having a restriction 16 therein. As the flow rate of the liquid through the channel increases and decreases, the head height within the flow channel rises and falls.

Figure 4:
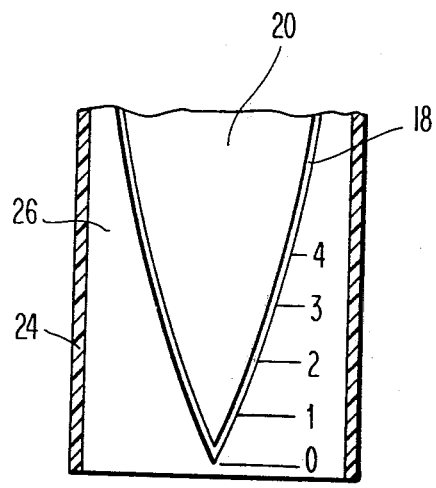
FIG. 4 is a frontal view taken along line 4—4 of FIG. 3.
Figure 3:
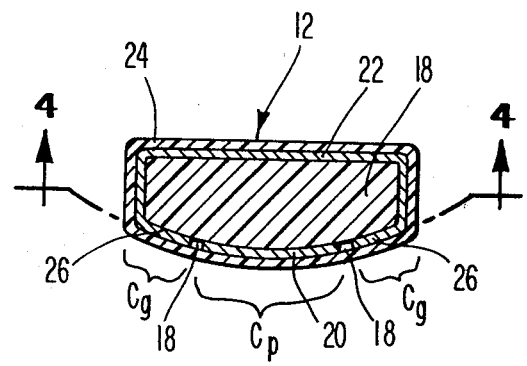
FIG. 3 is a sectional view of a flow rate sensing probe constructed in accordance with this invention.

A preferred embodiment of an RF admittance sensing probe adapted to be utilized as the probe 12 mounted on a grounded wall 15 of the flow channel 14 in FIG. 1 will now be described in detail with reference to FIGS. 3 and 4. As shown in FIGS. 3 and 4, the probe comprises an insulating substrate 18 having a conductive probe electrode 20 extending longitudinally along the front of the probe. The probe further comprises a conductive guard electrode 22, adapted to be driven at the same potential as the probe electrode 20, which extends longitudinally along the back of the probe with the substrate 18 between the probe electrode 20 and the guard electrode 22.

In accordance with one important aspect of the invention, the conductive guard electrode 22 extends laterally outwardly from behind the probe electrode 20 at opposite lateral extremities thereof and around to the front of the probe 12 so as to closely couple any coating of conductive liquid which accumulates on the probe 12 to the potential of the guard electrode 22 and precludes resistive coupling of the conductive coating around the sides of the probe to the wall 15 of the flow channel which is effectively grounded. The close coupling of the coating at the sides of the probe 12 near the guard electrode 22 is assured by providing an exterior solid insulation means in the form of a sleeve 24, which may be of the heat-shrunk type, such that the capacitance $C_g$ from the guard electrode to the surface of the probe is substantial with respect to, i.e., at least 50% as great as, the capacitance $C_p$ of the insulating cover 24 from the frontal surface of the probe electrode 20 to the frontal surface of the insulating cover 24. Note that due to the uniform thickness of the sleeve 24, the capacitance through the sleeve 24 per unit area at the guard electrode 22 will be equal to the capacitance through the sleeve 24 per unit area at the probe electrode 20.

By eliminating the resistive coupling around the probe, the capacitance to ground as measured by the probe electrode 20 may be measured in accordance with the technique disclosed in U.S. Pat. No. 3,746,975 to Maltby, assigned to the assignee of this invention, which eliminates the effects of the coating accumulated on the probe. The basis for this measuring technique disclosed in U.S. Pat. No. 3,746,975 is that a coating, after a certain length, will act as an infinite transmission line whose characteristic terminal impedance is predictable. The resistive and capacitive components are measured, and the effects of the coating can be computed and eliminated. The above is true assuming the resistive coupling extends longitudinally along the sensing element of the probe to the conductive liquid being measured rather than around the probe to a grounded wall. Since the conductive guard electrode 24 with its frontal portion 26 closely coupled to the coating will prevent resistive current from flowing around the probe, the coating will appear as a model of the infinite transmission line enabling the use of the technique disclosed in the aforesaid U.S. Pat. No. 3,746,975 patent.

In further accordance with this invention, the probe electrode 20 is characterized, i.e., the lateral dimension of the probe electrode decreases with decreasing distance from one longitudinal end of the probe as shown in FIG. 4. Furthermore, the frontal portion 26 of the probe is also characterized in that the lateral dimension of the frontal portion increases with decreasing distance from the longitudinal end of the probe. As a result of the characterized nature of the frontal portion of the guard electrode, the resistive coupling of the coating on the probe increases as the head height of the liquid decreases so as to further reduce the effects of the resistive coating on the capacitance measurement.

It will be understood that the probe electrode may be characterized so as to accurately read the flow in the particular channel in which the probe is mounted. In this connection, the probe may be characterized by the following equation $$b = k_1 \alpha H^{(\alpha-1)} \qquad (1)$$

where
b = the width of the probe;
$k_1$ = a constant;
$\alpha$ = a constant depending upon the shape of the flow channel;
H = the height of the stream above the zero flow level; and
the flow through the channel may be expressed by the equation $$Q = k_1 H^\alpha \qquad (2)$$

For a full understanding of the importance of the guard electrode 22 with its frontal portions 26, reference may be made to FIGS. 5(a–g) which depict probes having coatings and the effects of the coatings on the probe measurement. As shown in FIG. 5a, a non-characterized probe electrode p having an insulate cover is placed in a conductive liquid l. As the level of the conductive liquid l falls, a coating c is left on the probe electrode p. As shown in FIG. 5a, the probe electrode p is mounted away from the conductive wall of the vessel or flow channel, i.e., the probe p is mounted in the position of the probe 10 shown in FIG. 1.

Figure 5A:
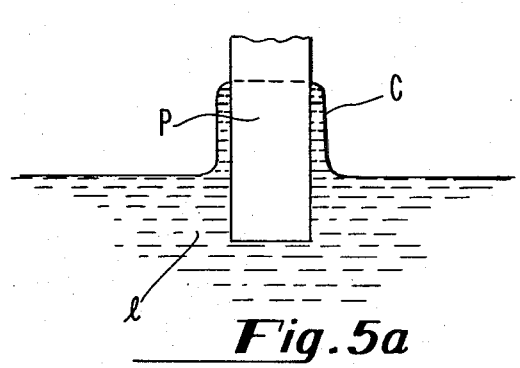
FIGS. 5(a–g) are schematic representations of probes and probe potentials utilized in explaining the advantages of a probe such as that shown in FIGS. 3 and 4.
Figure 5B:
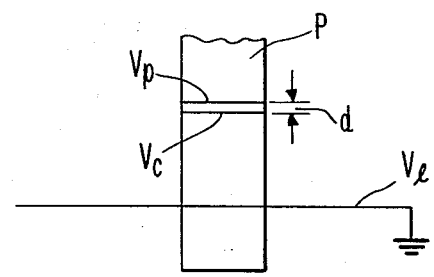

As shown in FIG. 5b, the potential or voltage of the coating c in FIG. 5a represented by the line $v_c$ is substantially constant along the width or lateral dimension of the probe p and only slightly below (a potential drop d) the potential or voltage $v_p$ of the probe itself. Since the liquid l is conductive, and the liquid l is contained in a grounded vessel or flow channel, the potential level of the liquid l is represented by the line $v_l$ which is maintained at ground. It will be seen from FIG. 5b that the coating itself has very little effect on the probe measurement since the potential seen by the probe electrode p above the liquid level l is substantially the same as the potential $v_p$ of the probe itself as long as the probe is not mounted against a grounded wall or support member in the vessel or flow channel.

Figure 5C:
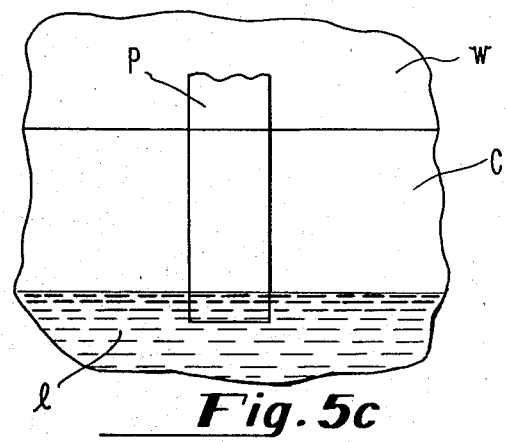

FIG. 5c depicts the mounting of the probe p against a wall w such that a coating of the liquid l extends across the probe electrode p and along the wall w. Since the coating c is again conductive, the coating c provides a resistive path to ground from the probe electrode p to the grounded liquid l.

Figure 5D:
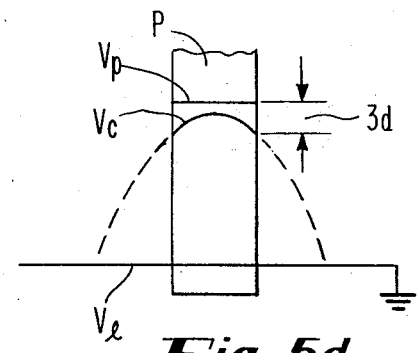

As shown in FIG. 5d, the coating c of FIG. 5c which provides a path to ground having a relatively small resistance produces a very substantial coating error since the probe potential $v_p$ as shown in FIG. 5d remains the same but the coating potential $v_c$ droops considerably toward ground at the lateral extremities (a potential drop of 3d). Thus, a worse coating error results when the probe is mounted along the wall of the vessel than when the probe is mounted away from the wall for the same thickness of coating c and the same width or lateral dimension of the probe p.

Figure 5E:
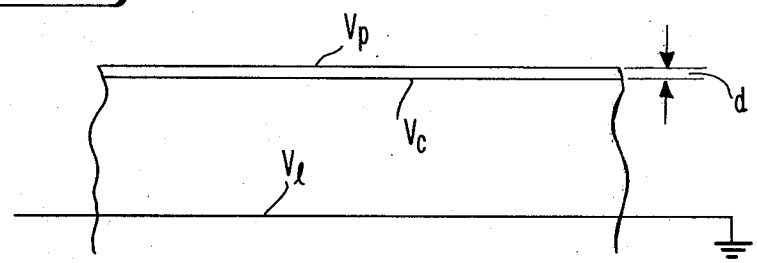

From FIG. 5e, it will be appreciated that a probe of infinite width may be mounted along the wall of the vessel or flow channel without a substantial coating error. As shown in FIG. 5e, the coating potential $v_c$ is substantially constant and only slightly below the probe potential $v_p$ (a drop of d) along the entire width of the probe. However, from a practical standpoint, it is not possible to give the probe infinite width. This is particularly true where the probe electrode must be characterized as in the case of the probe shown in FIGS. 3 and 4 so as to provide an indication of flow rate through a flow channel. In such a case, the probe electrode becomes extremely narrow at the lower end thereof.

Figure 5F:
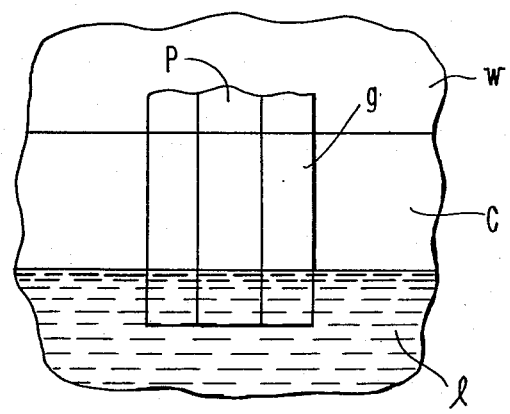
Figure 5G:
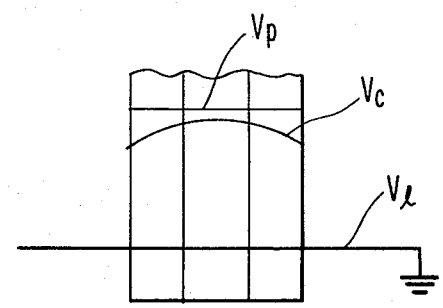

By providing a guard electrode g as shown in FIG. 5f at the lateral extremities of the probe electrode p and the wall w, the advantages of a relatively wide probe electrode are achieved without making the probe electrode p itself excessively wide. Since the guard electrode g is driven at substantially the same potential as the probe electrode p, the potential $v_c$ as shown in FIG. 5g droops across the entire width of the probe electrode p plus the guard electrode g. However, the actual droop at the lateral extremities of the probe electrode p is not great, i.e., the potential $v_c$ at the lateral extremities is no more than 25% of the potential drop between $v_c$ at the center of the probe p and the potential $v_p$ of the probe electrode itself. As shown in FIG. 5g, the potential $v_c$ at the probe electrode p is substantially constant and only slightly below the potential $v_p$ of the probe electrode p itself thereby minimizing the coating error. Preferably, the droop (i.e., the drop in the potential $v_c$ from the center of the probe electrode p to the lateral extremity) is less than the voltage drop between $v_p$ and $v_c$ at the center of the probe.

From the foregoing, the following conclusions may be reached. First, the sensing or probe electrode p should be as wide as possible so that the capacitive coupling through the insulation covering the probe electrode is as high as possible. In addition, the guard electrode g should extend between the lateral extremities of the probe electrode p and any adjacent wall so as to be as well coupled to the coating as possible without loading. For purposes of this invention, the guard electrode g is considered closely coupled to the conductive liquid when the capacitive coupling is at least 50% of the capacitive coupling between the liquid and the probe electrode p. In general, it has been found that the lateral portions which extend laterally outwardly a substantially greater distance than the minimum thickness of the exterior insulation provide the necessary close coupling. Typically, the distance is greater than the spacing between the lateral portions of the guard electrode and the probe electrode plus the thickness of the guard electrode. Preferably, the distance is at least six times greater than the thickness of the exterior insulation covering the guard electrode divided by the dielectric constant of the exterior insulation. Of course, for the characterized probes of FIGS. 3 and 4, the lateral extension will vary as a function of distance from the end of the probe. However, the distance of "six times" is applicable over the entire measuring length of the probe or at least a substantial portion thereof.

Figure 6:
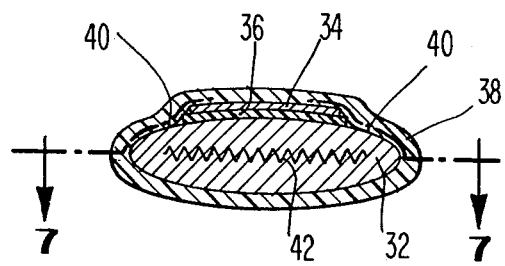
FIG. 6 is a sectional view of another sensing probe constructed in accordance with this invention.
Figure 7:
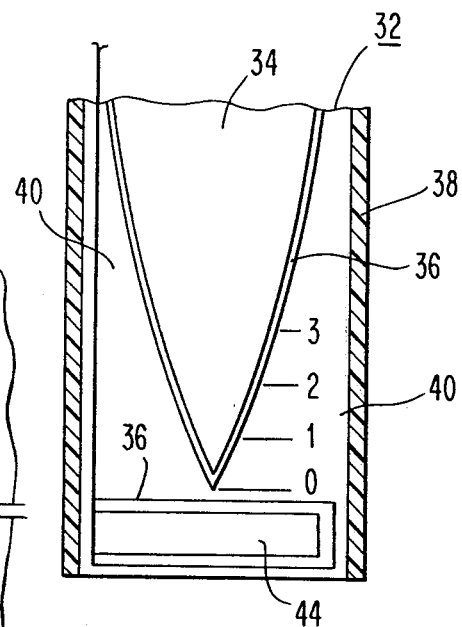
FIG. 7 is a frontal view taken along line 7—7 of FIG. 6.

Another embodiment of a probe constructed in accordance with the principles of this invention is disclosed in FIGS. 6 and 7. As shown there, a backing or guard electrode 32 comprises a conductive substrate which is relatively thick, as measured from front-to-back, as compared with a probe electrode 34 and intermediate insulation material 36. In the embodiment of FIGS. 6 and 7, the thick guard electrode substrate 32 provides the mechanical strength for the probe, which mechanical strength is provided by the thick insulating substrate 18 in the probe of FIGS. 3 and 4. Note that any coating which accumulates on the probe in FIGS. 6 and 7 adjacent frontal portions 40 of the guard electrode will be closely coupled to the potential of the guard electrode due to the fact that the only insulation between the coating and the guard electrode 32 is a sleeve 38 and frontal portions 40 of the guard electrode 32. As a result, the capacitance $C_g$ through the frontal portions 40 is not substantially less than the capacitance $C_p$ to the probe electrode 34 through the cover 38. The guard electrode substrate 32 has a curved frontal surface so as to permit the use of a heat-shrunk tube for the sleeve 38 which will minimize the air spaces between the guard electrode 32 and the sleeve 38.

In accordance with another important aspect of the invention, the conductive guard electrode 32 encloses a heating coil 42 which is adapted to heat the overall probe structure to a temperature so as to prevent the accumulation of a coating, e.g., grease, on the probe. Where the supply of power available is limited, it may be desirable to only activate the heating element 42 if a predetermined thickness of grease has accumulated on the probe. This may be accomplished by providing an additional sensing electrode 44 as shown in FIG. 7 which is covered by the sleeve 38. By locating the electrode 44 beneath the longitudinal end of the probe electrode 34, the sensing electrode 44 will be in a position to detect a grease build-up even though the level of the liquid in the flow channel is relatively low. By periodically dispersing any grease buildup, the indicia on the probe remain visible.

Figure 8:
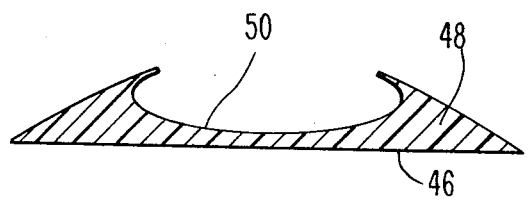
FIG. 8 is a sectional view of a track for mounting the probe of FIGS. 6 and 7.
Figure 9:
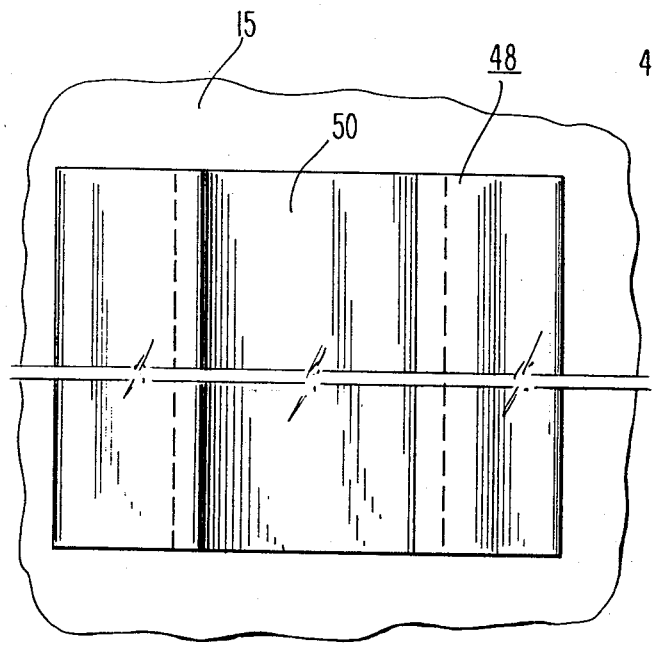
FIG. 9 is a frontal view of the track shown in FIG. 8 mounted on the wall of a flow channel.

FIG. 8 discloses a track 48 having a surface 46 for mounting on the wall 52 of a flow channel as shown in FIG. 9. The track includes a concave recess 50 adapted to receive the probe of FIGS. 6 and 7. When the track is mounted such that the longitudinal axis of the concave recess 50 extends vertically up the wall 52 of the flow channel, the probe of FIGS. 6 and 7 may be moved vertically through the track to assist in calibrating the probe.

Figure 10:
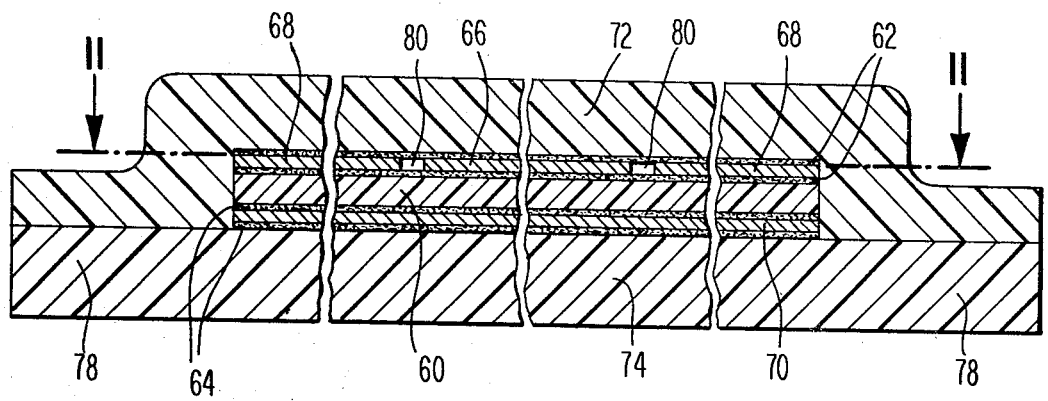
FIG. 10 is a sectional view of another sensing probe constructed in accordance with this invention.
Figure 11:
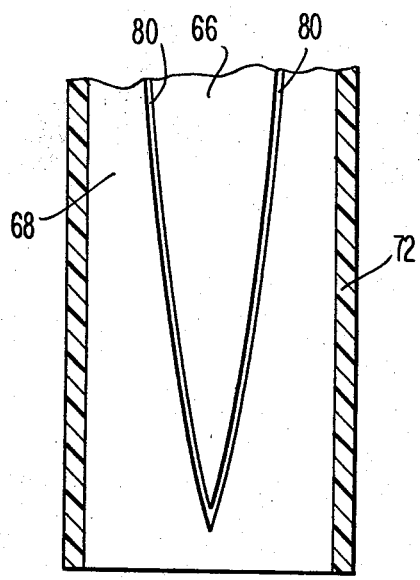
FIG. 11 is a frontal view taken along line 11—11 of FIG. 10.

Another embodiment of the probe constructed in accordance with the principles of this invention is disclosed in FIGS. 10 and 11. This probe, which is relatively inexpensive to produce, comprises a laminated structure including an interior insulation substrate 60 with inner adhesive layers 62 and 64 which bond a probe electrode 66 and frontal guard electrode 68 to the front of the substrate 60 and a rear guard electrode 70 to the rear of the substrate 60. The foregoing structure is then sandwiched between two sheets of exterior insulation 72 and 74 with outer adhesive layers 62 and 64 in between which are heat sealed to one another along edges 78. As shown in FIG. 11, the probe electrode 66 is characterized and separated from the frontal guard electrode 68 by a slight space 80. A probe of this type may be very thin, i.e., less than ⅜ inch thick and preferably less than 1/16 inch thick.

Figure 12A:
FIGS. 12(a–e) depict a method of making the probe of FIGS. 10 and 11.
Figure 12B:
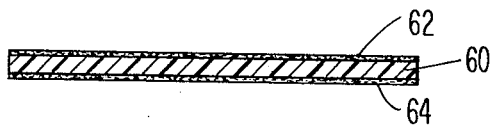
Figure 12C:
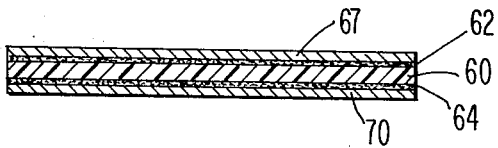
Figure 12D:
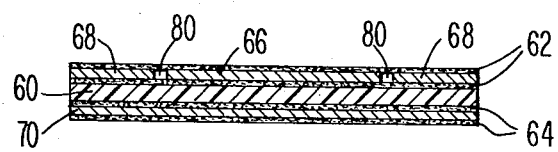
Figure 12E:
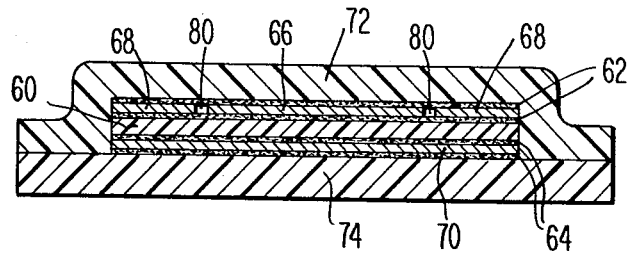

A method for making the probe of FIGS. 10 and 11 will now be described with reference to FIGS. 12(a-f). The bare substrate 60 as shown in FIG. 12a is first coated with the inner adhesive layers 62 and 64 such as a polyester adhesive film as shown in FIG. 12b. Next, a copper film 70 and a copper film 67 are applied over the adhesive layers 62 and 64 as shown in FIG. 12c. At this time, the film 67 may be etched to form the probe electrode 66 and the frontal guard electrode 68 as shown in FIG. 12d. The sheets 72 and 74 are then applied over outer adhesive layers 62 and 64 and the entire structure is laminated under heat and pressure as shown in FIG. 12e. The edges of the sheets 72 and 74 are finally heat sealed to each other along the lateral extremities to complete the probe.

One particular advantage of a probe such as that shown in FIGS. 10 and 11 is its flexibility so as to permit it to be mounted in a curved track which conforms with the curvature of the wall in a vessel or flow channel, i.e., extends vertically and horizontally. In this connection, the substrate 60 may comprise Mylar. Mylar provides the necessary flexibility and support for the probe structure while at the same time having a sufficiently low dielectric constant to insulate the probe electrode 66 from the rear guard electrode 70.

Preferably, the exterior insulation sheets 70 and 72 are characterized by high strength so as to resist abrasion and cut-through due to floating debris. At the same time, it is preferable that the sheets 70 and 72 have a very high dielectric constant so as to effectively capacitively couple the potential of the frontal guard electrode 68 to the accumulated coating on the probe adjacent thereto. In this connection, it has been found that a fluorocarbon resin such as crystalline, high molecular weight polymer of vinylidene fluoride having a dielectric in excess of 4 is particularly well suited for use as the exterior insulation of the probe. One particularly good material for this purpose is the high molecular weight polymer of vinylidene fluoride which is supplied by Pennwalt Corporation under the trade name of Kynar. Generally, Kynar is characterized by a dielectric constant of 8 with a good deal of abrasion or cut-through resistance.

The main advantage of using a high performance fluorocarbon resin such as Kynar in a probe such as that shown in FIGS. 10 and 11 is that the combination of its mechanical and electrical characteristics enable the system to ignore coatings which are developed on the probe. The degree to which the coatings can be ignored is dependent upon the measuring technique as described in the aforesaid U.S. Pat. No. 3,746,975 and also the capacity per square inch of the probe insulation. The higher the capacitive coupling of the probe, the smaller the error due to coatings which are deposited on the probe element. In general, the capacitance through insulating material may be expressed by the following equation:

$$c = \frac{K_a A K_3}{t_1} \quad (3)$$

where
$K_a$ = a constant;
A = the surface area of the insulation;
$K_3$ = the dielectric constant; and
t = the thickness of the insulation.

Because Kynar is tough, i.e., resistant to abrasion and "cut-through", it can be very thin. For example, Kynar can be less than one-half as thick as Teflon and still provide the same resistance to "cut-through". In addition, the high dielectric constant of 8 for Kynar as compared with approximately 2.2 for Teflon permits the Kynar to provide a capacitive coupling 3.6 times higher than the same thickness of Teflon. The combined effect of the reduced thickness of Kynar as compared with Teflon and the larger dielectric constant of Kynar as compared with Teflon, allows a Kynar covered probe to have a coupling capacity at least 7 to 8 times higher than a Teflon covered probe. Since the increased ability of the probe to ignore coatings is equal to the square root of the increase in the coupling capacity, a probe made with Kynar will reduce errors due to coating by more than one-third of that encountered by a probe made with Teflon.

From the foregoing, it will be understood that the probe itself should be particularly thin so as to avoid disturbing the flow or movement of the liquid in a vessel. However, a thin probe may be very difficult to mount since it may be so flexible so as to be incapable of self-support, i.e., incapable of resisting deflection when turned at right angles with respect to the flow or movement of liquid in the vessel. Generally, such an incapability exists when the ratio of probe width to thickness is greater than 20 to 1. The addition, it is generally desirable to mount the probe so as to facilitate its removal for replacement, repair and calibration.

Figure 13:
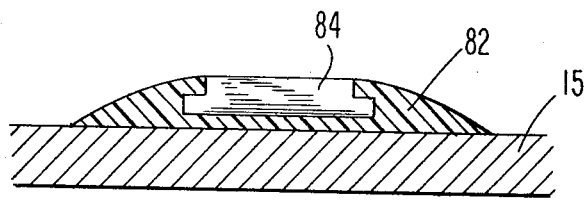
FIG. 13 is a sectional view of the probe of FIGS. 10 and 11 mounted in a track attached to a flow channel.

In accordance with the mounting requirements, the flexible probe of FIGS. 10 and 11 may be inserted into a track 82 such as that shown in FIG. 13 which has an opening 84 which generally conforms with the shape of the removable probe. The track 82 may then be mounted on the wall 15 of the flow channel even though the wall 15 is curved since the track may be flexible as well as the probe. Note that the opening 84 in the track 82 is adapted to be substantially filled by the probe so as to eliminate any cracks and crevices in which materials might accumulate.

Figure 14:
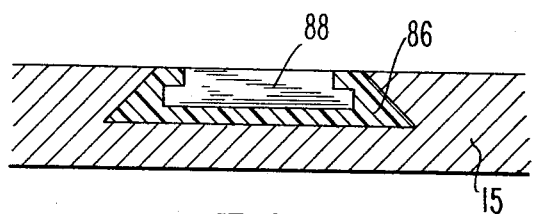
FIG. 14 is a sectional view of the probe of FIGS. 10 and 11 mounted in a track cast within the wall of a flow channel.
Figure 15:
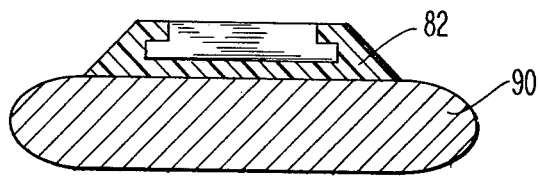
FIG. 15 is a sectional view of the probe and track in FIG. 13 mounted on a mechanical support within a flow channel.

It is also possible to cast a recessed track 86 into the wall 15 as shown in FIG. 14 where the opening 88 through the track conforms with the shape of the removable probe. As an alternative, the wall 15 may itself be formed or molded so as to provide an opening 88 which acts as a recessed track for the probe as shown in FIG. 14a. In FIGS. 14 and 14a, it is particularly desirable to limit the thickness of the probe where the wall 15 is relatively thin. As shown in FIG. 15, the track 82 is mounted on a mechanical support member 90 in a vessel or container. Since the removable probe would include guard electrodes, the support member 90 may be effectively grounded as in the case of the wall 15 in the embodiment of FIGS. 13 and 14. The mechanical support member 90 is tapered at the ends thereof so as to minimize the effect of the support member 90 on the flow through a flow channel.

Figure 16:
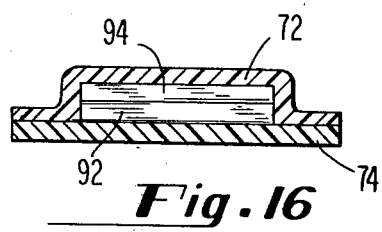
FIG. 16 is a sectional view of the probe of FIGS. 10 and 11 with an integral heating element.
Figure 17:
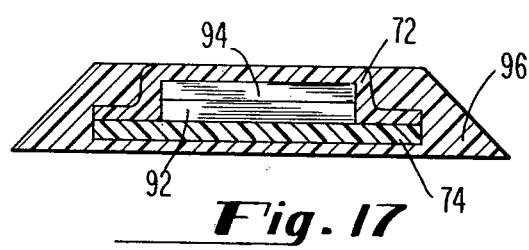
FIG. 17 is a sectional view of the probe of FIG. 16 mounted in a track adapted to be mounted on the wall of the flow channel.

FIG. 16 shows a probe of the type shown in FIGS. 10 and 11 except that a discrete heater element 92 is included in the laminated structure behind the guard electrode 70 but between the insulating sheets 72 and 74. If the heater element 92 which may comprise a suitable resistive heating element is made flexible, the entire structure shown in FIG. 16 may be inserted into the tracks 82 and 86 shown in FIGS. 13, 14 and 15 as shown in FIG. 17. As an alternative, the heating element 92 may be located outside and behind the laminated probe structure within the longitudinal opening 94 of a track 96.

Figure 18:
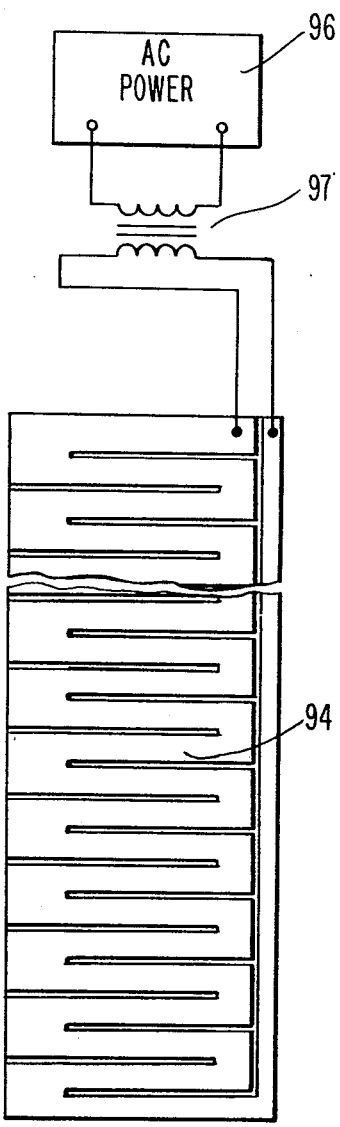
FIG. 18 is a sectional view of an alternative guard electrode for the probe of FIGS. 10 and 11 which may be utilized as a heating element.

As a still further alternative, the rear guard electrode 70 of the probe in FIGS. 10 and 11 may be of a generally serpentine shape so as to provide a combined guard electrode and heating element for the probe. Such a serpentine guard electrode 94 is shown in FIG. 18 in combination with a source of AC power 96 which is coupled to the guard electrode 94 through an isolation transformer 97 with a low capacitive coupling. The guard electrode 94 is also connected to a source of guard potential not shown. As utilized herein, a low capacitive coupling is intended to mean a capacitive coupling with an impedance which is high relative to the impedance of the guard terminal to which the guard electrode is connected.

It will of course be appreciated that the capacitance through the exterior insulation of a probe constructed in accordance with this invention is the capacitance which is measured by the probe since the liquid or materials whose level is being measured is substantially conductive. Thus, any variation in the dielectric constant of the insulation with temperature will produce an error. In accordance with one important aspect of the invention, the probe of the type shown in FIGS. 10 and 11 includes a compensating electrode 98 which is positioned below the lower end of the probe electrode 66 and insulated from the guard electrode by an appropriate spacing which may be achieved by appropriately etching the conductive film which forms the frontal guard electrodes 68 and the probe electrode 66. By measuring the change in the dielectric constant of the exterior insulation 72 not shown in FIG. 19 and utilizing that to compensate and correct the measurement of the capacitance through the insulation 72 juxtaposed to the probe electrode 66 below the level of the conductive liquid, accurate measurements of the liquid level may be achieved. Note that the compensating probe electrode 98 is located in a position which will always remain below the liquid in the vessel or flow channel.

Figure 20:
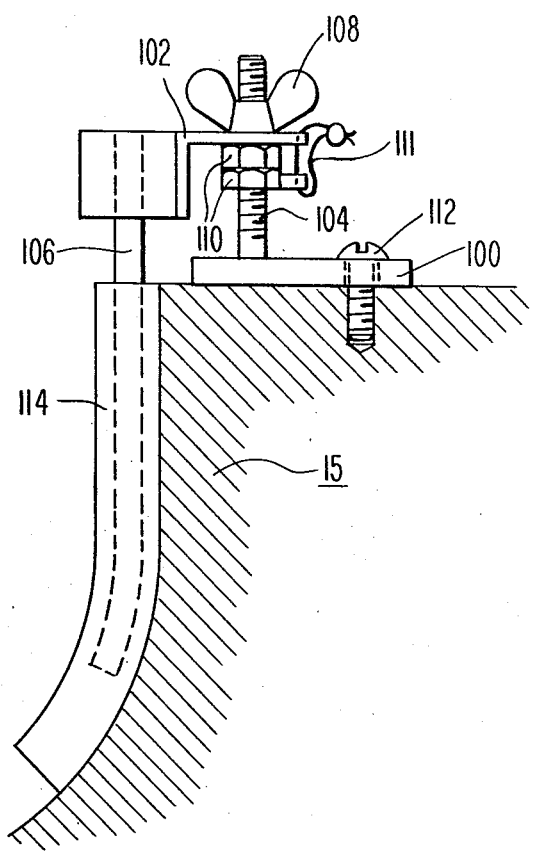
FIG. 20 is a sectional view of means for mounting a probe in a precalibrated position on the curved wall of a flow channel.

In accordance with another important aspect of the invention, a probe of the type shown in FIGS. 10 and 11 may be precalibrated outside of the flow channel and then returned to the flow channel and readily mounted in the appropriate position. As shown in FIG. 20, a mounting apparatus on the wall of the flow channel includes a base plate 100 which supports a mounting bracket 102 on a threaded stud 104. The bracket 102 which is attached by a suitable means to the upper end of the probe 106 may be readily removed from the stud 104 by removing a wing nut 108. Once the probe 106 is removed from the flow channel, it may be inserted into a suitable calibrating vessel so as to establish an appropriate zero level. The probe 106 with the mounting bracket 102 may then be returned to the stud 104 and positioned at the appropriate zero level by moving the nuts 110 to the appropriate position on the stud 104. The wing nut 108 may then be secured to the stud 104 so as to clamp the bracket 102 in the appropriate position. In order to assist in positioning the probe 106 in the zero level position, suitable indicia such as those shown on the probe in FIGS. 4 and 7 may be utilized. The base plate 100 of the mounting means may be attached to the wall 15 by suitable means such as a threaded fastener 112. Note that the probe 106 extends into a track 114 having a curved longitudinal groove and the probe 106 must therefore be flexible enough to follow this groove when inserted into the track. In order to assure that the probe 106 is not raised or lowered with respect to the wall 15, a wire seal 111 is provided which extends between and through openings in the bracket 102 and the lowermost nut 110.

As indicated in the foregoing, it is oftentimes desirable to mount a probe so as to conform with a curvature of a wall in a flow channel or other vessel. However, where the probe does follow the curvature of the wall in a flow channel, the probe must be characterized differently from a probe which extends vertically. Consider, for example, the characterization necessary for a probe which is mounted flush against the wall of a circular pipe as schematically depicted in FIG. 21a where the probe 120 extends along half of the pipe 122 and the height H of the liquid within the pipe corresponds with the submerged length $H_1$. R. corresponds to the radius of the pipe. The flow rate through the pipe may be expressed by the equation $$Q = K_4 H^\alpha \tag{4}$$

where $K_4$ is a constant and the width of the probe may be expressed by the equation $$b = K_5 H^{\alpha-1}$$

where $K_5$ is a constant, keeping in mind that the relationship between H and $H_1$ for a circular pipe is $$H_1 = \left[ \frac{\text{Arc cos}\left(\frac{R-H}{R}\right)}{360} \right] [2\pi R]. \tag{5}$$

Figure 21B:
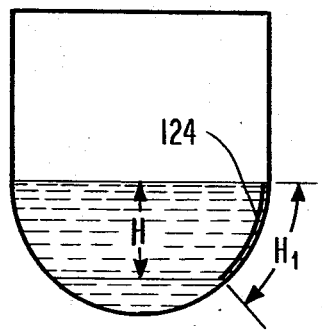
FIGS. 21(a-b) are schematic representations utilized in explaining the dual characterization of probes mounted along a curved wall of a flow channel.
Figure 21A:
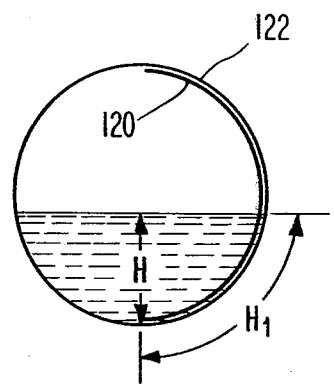

Similarly, for a Leopold Logco flume as shown in FIG. 21b where H represents the height of the stream above the zero level and $H_1$ represents the length of the probe covered by the stream, the flow rate may be expressed by the equation $$Q = K_6 H^{1.547} \tag{6}$$

where $K_6$ is a constant and the width of the probe may be expressed by the equation $$b = K_7 H^{0.547}$$

where $K_7$ is a constant and where $$H_1 = \left[ \frac{\text{Arc cos}\left(\frac{R-H}{R}\right)}{360} \right] [2\pi R] \tag{7}$$

below the straight walls of the flume. Assuming that the semicircular portion of the flume has a radius of 3 inches and the width b of the probe is 1 inch at a height H equal to 5 inches, the probe would be characterized as follows:

| $H_1$ | W |
|---|---|
| 0 | 0 |
| .30 | .142 |
| .59 | .272 |
| 1.12 | .407 |
| 1.64 | .516 |
| 2.15 | .582 |
| 2.65 | .584 |
| 3.15 | .757 |
| 4.15 | .85 |
| 5.15 | 1.0 |

This compares with the characterization for a straight probe in the Leopold Logco flume which follows:

| H | W |
|---|---|
| 0 | 0 |
| .25 | .194 |
| .5 | .283 |
| 1.0 | .414 |
| 1.5 | .517 |
| 2.0 | .605 |
| 2.5 | .684 |
| 3.0 | .757 |
| 4.0 | .85 |
| 5.0 | 1.0 |

To readily see that the characterizations are different the relationship between H and W and $H_1$ and $W_1$ can be normalized as shown below:

| H | W | $H_1$ | $W_1$ |
|---|---|---|---|
| 0 | 0 | 0 | |
| .050 | .194 | .058 | .142 |
| .100 | .283 | .115 | .272 |
| .200 | .414 | .217 | .407 |
| .300 | .517 | .318 | .516 |
| .400 | .605 | .417 | .582 |
| .500 | .684 | .515 | .684 |
| .600 | .757 | .612 | .757 |
| .800 | .850 | .806 | .850 |
| 1.00 | 1.000 | 1.00 | 1.000 |

Figure 22:
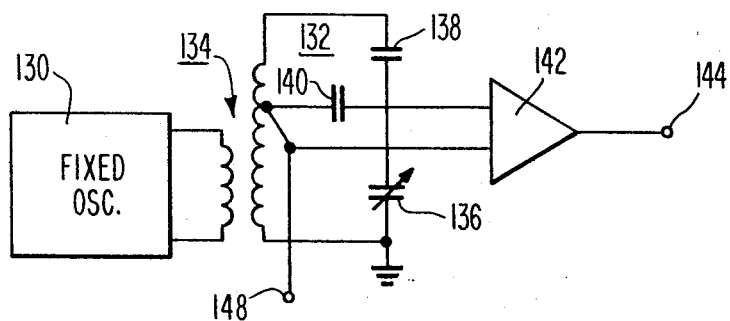
FIGS. 22 and 23 are schematic diagrams of a circuit in which the various probe embodiments of the invention may be utilized.

FIG. 22 illustrates a circuit in which the capacitance between the probe electrodes, e.g., the probe electrode 66 of FIGS. 10 and 11, and ground is measured. The circuit includes a fixed frequency RF oscillator 130 which drives a bridge network 132 through a transformer 134 where the secondary of the transformer forms one side of the bridge 132. The capacitance sensed by the probe electrode is represented by a variable capacitor 136 which is connected between a capacitor 138 and ground. Any variation in the capacitor 136 which represents the change in the level of the liquids being measured produces a signal across a span capacitor 140 and the signal across the span capacitor 140 may be applied to an amplifier 142 to generate a guard potential and an output terminal 144 which is equal to the potential of the probe electrode.

Figure 19:
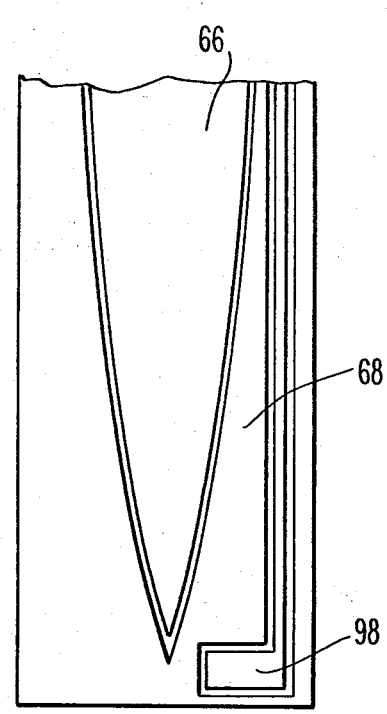
FIG. 19 is a sectional view of a probe similar to that of FIGS. 10 and 11 including an additional electrode measuring variations in the dielectric current of the exterior insulation.
Figure 23:
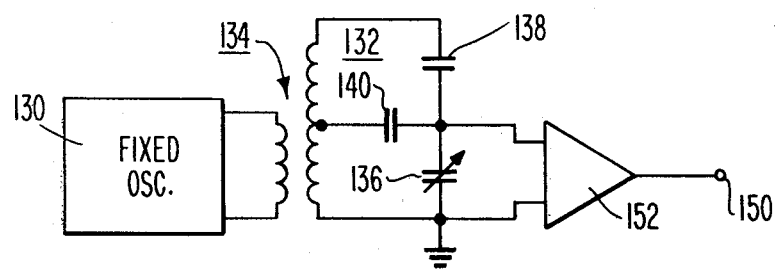
Figure 24:
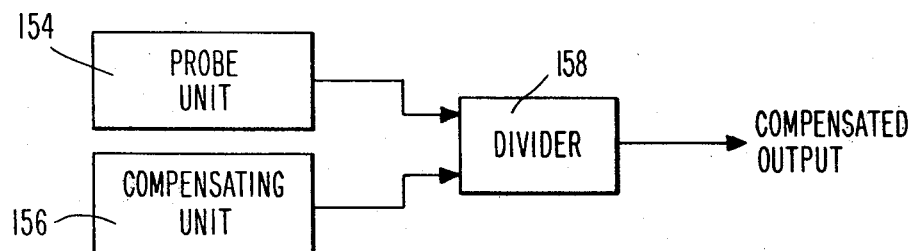
FIG. 24 is a block diagram of circuitry which may be utilized in conjunction with a probe of the type shown in FIG. 19.

In some instances, the guard electrode may be driven at a potential which does not equal the potential of the probe electrode at all times. This may be achieved by connecting the junction of the span capacitor 140 and the secondary of the transformer 134 to the guard electrode at an output terminal 148. The potential at the terminal 148 will equal the potential at the probe electrode when the bridge is balanced. In the circuit of FIG. 23, the potential for the guard electrode is obtained at the output terminal 150 of an amplifier 152 which is connected across the probe electrode 136.

Where the probe includes a compensating electrode 98 as shown in the probe of FIG. 19, additional circuitry must be provided in order to provide a compensated output signal. Such circuitry is shown in FIG. 24 wherein a probe unit 154 represents the circuitry shown in FIG. 22 and the output from the probe unit 154 represents the signal across the span capactor 140. A similar circuit wherein the measured probe capacitance 136 is replaced by the capacitance between the compensating electrode 98 of the probe in FIG. 19 and ground is shown as a compensating unit 156 in FIG. 24. The output from the probe unit 154 and the output from the compensating unit 156 are then applied to a divider 158 which produces a compensated output signal which is unaffected by changes in the dielectric constant of the probe exterior insulation.

In the foregoing, a good deal of emphasis has been placed upon the significance of the frontal guard electrodes or frontal portions of the guard electrode. However, the rear guard electrode or rear portion of the guard electrode is also of considerable importance as will be clear from the following numerical example for the probe of FIG. 25. As shown there, the probe comprises front exterior insulation 160 having a capacitance $C_a$ where the insulation 160 covers a probe electrode 162. Interior insulation 164 separates the probe electrode 162 from a guard electrode 166 where the capacitance $C_b$ represents the capacitance through the insulation 164. Rear insulation 168 covers the guard electrode 166. As also shown in FIG. 25, the thickness through the insulation 160 is $d_a$ and the thickness through the insulation 164 is $d_b$.

Figure 25:
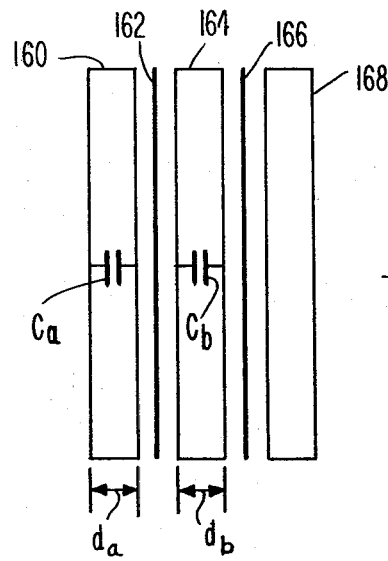
FIG. 25 is a schematic diagram utilized to explain the importance of a rear guard electrode.

Assume the probe of FIG. 25 is to measure liquid levels in a parshall flume and the probe has an active length of approximately 24 inches. Also assume that the probe is linear and is one inch wide.

For such a probe, the capacitance $$C = \frac{K_8 A K_9}{d} = .235 \frac{A K_9}{d} \tag{8}$$

where
C = capacity in pf;
$K_8$ = constant;
A = the area in square inches;
d = the spacing in inches; and
$K_9$ = dielectric constant of insulation.

Assume the dielectric constant $K_9$ of the material is 2.5 and the thickness $d_a$ and $d_b$ of the insulation 160 and 164 is 0.020 inches. From the foregoing, the capacitance $C_a$ may be calculated by the following equation:

$$C_a = 29.4L \tag{9}$$

where L is the length of the probe which is covered by the liquid in the flume.

Assume the probe is to be used for a 4 inch maximum head, corresponding to a full scale reading, such that $$C_a = (29.4)(4) = 117.5 \text{ pf.} \tag{10}$$

By similar calculations, the capacity $C_b$ equals $$C_b = \frac{(.235)(2.5)(1)(24)}{.020} \tag{11}$$

or $$C_b = 705 \text{ pf.} \tag{12}$$

$C_b$ is the standing capacity of the probe and is higher than $C_a$ as calculated above because 24 inches of the probe contributes to $C_b$ where only 4 inches contributes to $C_a$.

If it is assumed that the dielectric constant $K_9$ of the insulation 164 varies 5% over a 70° F. temperature range, the variation in $C_b$ would be 35.3 pf. and this would be equivalent to a 30% shift in the zero of the system. If it were desirable to keep the error due to the standing capacity to 3%, insulation thickness $d_b$ would have to be ten times thicker so that $C_b$ equals 70.5 pf. and a 5% change in the dielectric constant $K_9$ would produce a 3.5 pf. error, representing approximately a 3% error in the standing capacity.

Therefore, if the guard electrode 166 is driven at ground potential, there is a limit as to how thin the probe may be made. In the above numerical example, the probe would be limited to a thickness of 0.25 inches. Moreover, if the active length of the probe were longer, the probe would have to be even thicker and increases in thickness of the probe may be undesirable where the probe is intended to be mounted flush against the wall of a flume or vessel so as to minimize interference with the flow through the vessel or flume. However, by driving the guard electrode 166 at guard potential, the capacitance $C_b$ drops out of the measuring equation and the probe can be made as thin as the particular application requires. It should be appreciated that the use of a rear guard electrode is particularly important where the guard is removably mounted in a track since it is virtually impossible to prevent the collection of a liquid behind the probe in such a track.

Figure 26:
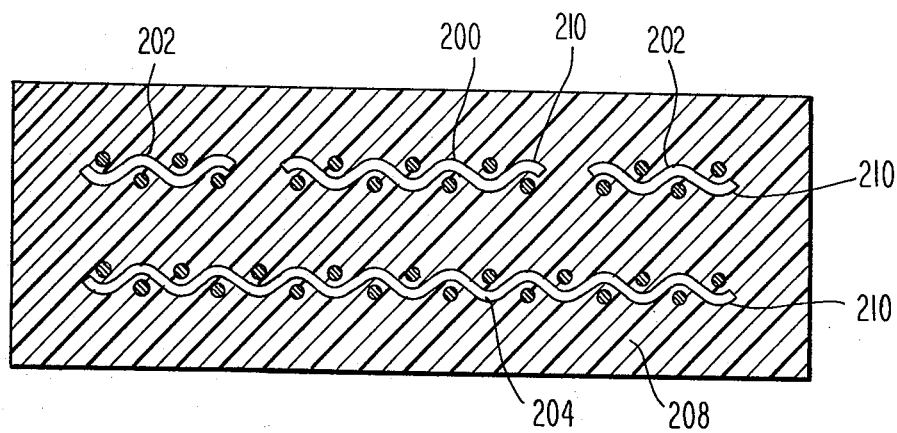
FIG. 26 is a sectional view of a probe embodying another important aspect of the invention.

A further embodiment of the probe which is constructed in accordance with the principles of this invention is disclosed in FIG. 26. The probe of FIG. 26 again comprises a laminated structure including a probe electrode 200, a frontal guard electrode 202 and a rear guard electrode 204. The electrodes are encapsulated within insulation comprising a heat curable insulation material 208 which applies compressive forces to the probe electrode 200.

Figure 27:
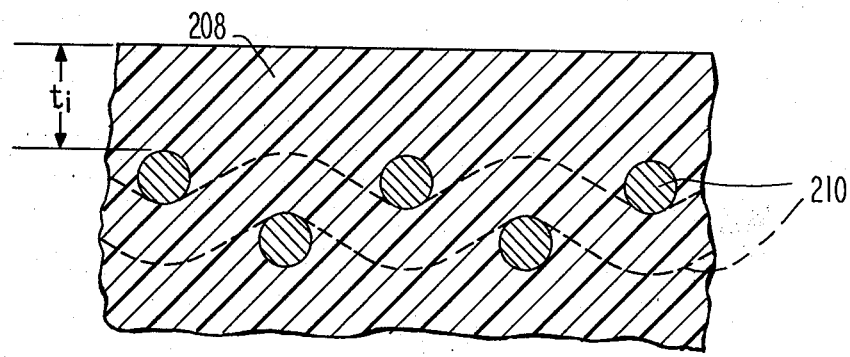
FIG. 27 is an enlarged fragmentary sectional view of the probe in FIG. 26 taken along line 27—27 of FIG. 28.
Figure 28:
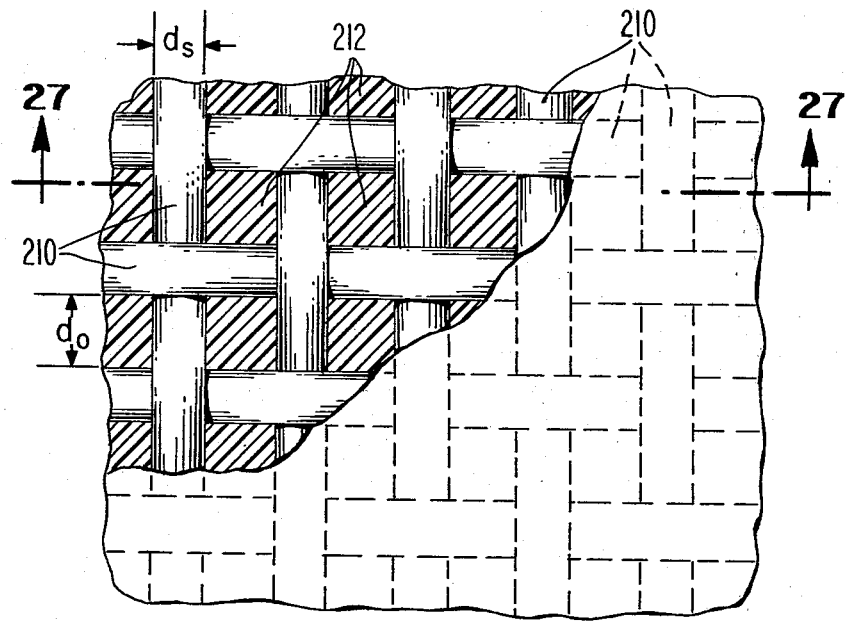
FIG. 28 is a partially broken away plan view of the fragmentary portion of the probe shown in FIG. 27.

In accordance with one very important aspect of the invention, the probe electrode 200 and the guard electrodes 202 and 204 comprise a multiplicity of openings which are formed by a wire mesh 210 which is shown in somewhat greater detail in FIG. 27. By utilizing a material for the insulation 208 which shrinks on cooling and providing a multiplicity of openings 212 in the mesh 210 as depicted in FIG. 28, compressive forces are applied over the surface area of the probe electrode 200, 202 and 204 including the surface area at the openings. These compressive forces exceed 100 psi of surface area preferably 500 psi under normal operating conditions.

In the probe structure of FIGS. 26-28, each wire in the mesh 210 is surrounded by the insulation material so as to mechanically grip each wire in the mesh 210. In other words, all of the interstices in mesh 210 are filled with the insulation material. This assures that water or other liquid whose flow rate or depth is being measured will not collect in pockets or voids adjacent the probe electrode 200. It will of course be appreciated that any collection of water adjacent the probe electrode 200 would change the calibration of the probe since the dielectric constant of water is 80 times the dielectric constant of air.

The mechanical grip and compressive forces around the wires of the mesh 210 is achieved as the insulation material contracts about the wires of the mesh 210 when the probe is cooled. In a particularly preferred embodiment, the insulation material comprises a thermoplastic material which forms a fusion bond through the openings 212 formed by the mesh 210. Subsequently, the thermoplastic material is cooled to achieve the compressive forces. Kynar is a highly preferred thermoplastic material for use as the thermoplastic insulation 208. However, other fluorocarbon resins may be utilized including but not limited to FEP (fluorinated ethylene propylene).

It has also been found that the grip around the wires in the mesh 210 is maximized by providing a multiplicity of substantially uniformly spaced openings extending along the length and breadth of the probe electrode 200 as well as the guard electrodes 202 and 204. It is also important that each filament or wire be surrounded by an adequate amount of insulation. In this connection, it has been found that the average maximum cross-sectional dimension $d_o$ of the openings is greater than 10% of the average diameters of the wires minimum spacing $d_s$ between openings in said probe electrode. Moreover, it is important that the distance $d_s$ between adjacent openings relative to the thickness of the insulation should not become too large. In this connection, it has been found that the thickness $t_i$ of the insulation as measured from said probe electrode to the exterior of the probe should be greater than 10% of the distance $d_s$. Preferably thickness $t_i$ is greater than $d_s$ with the optimum achieved when $t_i \geq 2d_s$ so as to produce a good mechanical grip on the electrode. In order to assure the proper RF field on the electrode, the minimum cross-sectional dimension $d_o$ of the openings should be no more than twice the thickness $t_i$ of the insulation. Finally it has been found that the avoidance of sharp edges or corners at the openings in the electrodes produces a better mechanical grip on the electrode. For this reason, a wire mesh such as that shown in FIGS. 26–28 is particularly desirable for use as an electrode since the openings are formed by strands or filaments of the mesh which are substantially circular in cross-section.

Figure 29:
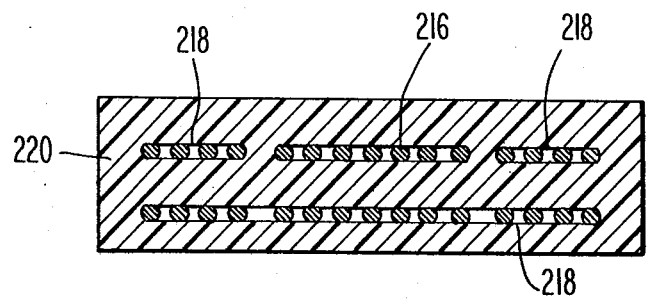
FIG. 29 is a sectional view of a probe similar to that shown in FIG. 26 representing yet another embodiment.
Figure 30:
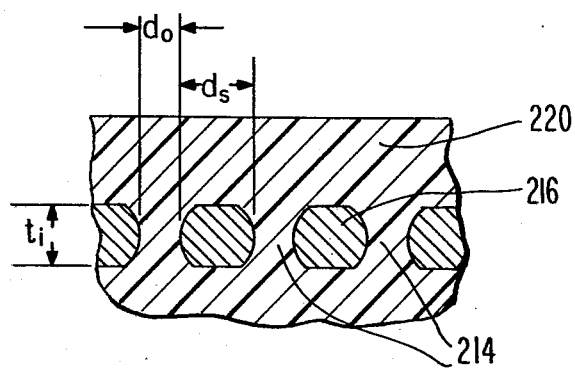
FIG. 30 is an enlarged fragmentary sectional view of the probe in FIG. 29 taken along line 31—31 of FIG. 31.
Figure 31:
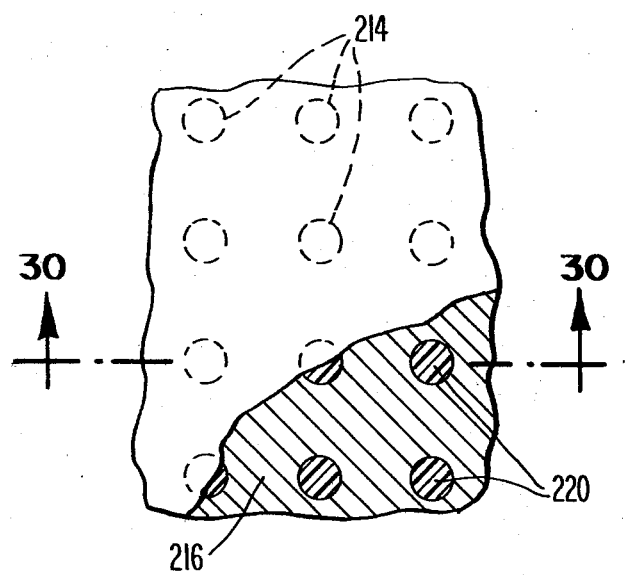
FIG. 31 is a partially broken away plan view of the fragmentary portion of the probe shown in FIG. 30.

FIGS. 29–31 show another embodiment of the invention wherein a multiplicity of openings 214 are formed in a probe electrode 216 and guard electrodes 218. The insulation 220 again forms a continuum through the openings 214 as best shown in FIG. 30.

However, the openings in the probe electrode 216 and the guard electrodes 218 are not formed by a wire mesh but rather formed by etching conductive sheets which form the probe electrode 216 and the guard electrodes 218. As best shown in FIG. 30, this etching achieves a natural roundness of the metal at the edges of the openings 214 thus assuring a maximized mechanical grip. Of course, the appropriate distance $d_s$, thickness $t_i$ opening dimension $d_o$ may be carefully controlled by well-known photographic techniques utilized in the printed circuit art. Preferably, the dimension $d_o$ and the thickness $t_i$ are equal to at least 25% of the distance $d_s$ (assuming no roundness at the openings) and preferably greater than $d_s$ where the optimum is achieved when $d_o$ and $t_i$ are greater than $d_s$.

The etching of the openings 214 may be done simultaneously with the shaping of the electrodes 216 and 218 as discussed with reference to FIGS. 12(a–e). It will therefore by understood that the probe electrode 216 may be characterized in a similar manner to that shown in FIG. 11. This of course is also true with respect to the electrode 200 and the adjacent guard electrode 202 of FIG. 26 although characterization may there be achieved by a mechanical cutting technique or etching.

Figure 32:
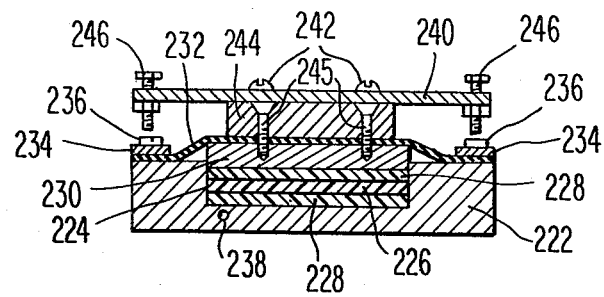
FIG. 32 is a sectional view of a press apparatus utilized in making the embodiments of FIGS. 26-28.

Apparatus for forming the laminated structures shown in FIGS. 26 and 29 will now be described with reference to FIG. 32. As shown there, the fixture comprises a base plate 222 having a channel 224 receiving the elements 226 of the probe. Pads 228 are positioned above and below the elements 226 within the channel 224. Preferably, the pads comprise a highly polished surface such as that provided by FEP Teflon so as to produce a smooth laminated surface which greatly impedes the build-up of any coating on the probe. An insert 230 which transmits pressure to the laminated structure is located immediately above the upper pad 228.

In accordance with one important aspect of this invention, uniform pressure is applied throughout the length of the laminated structure 226 within the chamber 222. This is accomplished by providing a flexible gasket 232 which extends above the insert 230 so as to form a substantially air-tight chamber. The gasket 232 is sealed in place by bolts 236 which extend through compression gaskets 234 and the sealing gasket 232 into holes within the base 222. Evacuation of the chamber beneath the gasket 232 is accomplished through a vacuum port 238 in the base 222.

In order to avoid trapping any air bubbles within the laminated structure 226, the chamber in which the structure 226 is located is evacuated before any pressure is applied to the laminated structure 226. This is accomplished by providing a bridge member 240 which is attached to a support member 244 by bolts 242. The member 244 is in turn attached to an insert 230 by bolts 245. The bridge member 240 is supported above the base 222 by bolts 246 which come to rest on a compression gasket 236. Once the chamber within which the laminated structure 226 is located is evacuated through the port 238 and all air bubbles have been removed, the bolts 242 may be removed so as to permit removal of the bridge 240 while atmospheric pressure uniformly applies an appropriate laminating pressure to the elements of the structure 226. The entire fixture may then be placed in an oven for heating to the melting point of the thermoplastic insulation material so as to form a desired fusion bond through the multiplicity of openings in the electrodes of the probe.

Figure 33:
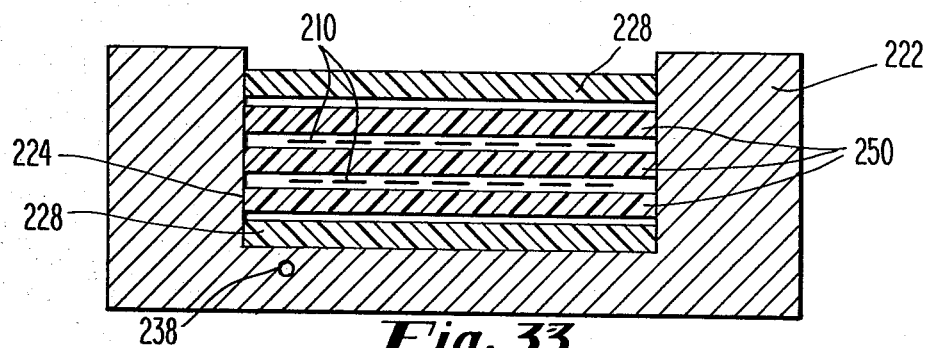
FIG. 33 represents a first step in the method of utilizing the apparatus of FIG. 32.

FIG. 33 depicts the elements of a probe structure prior to lamination sandwiched between pads 228 located within the channel 224 of the base 222. As shown, channel 224 has not yet been evacuated nor has any pressure yet been applied to the elements to be laminated. More particularly, air spaces exist between each wire mesh 210 and thermoplastic sheets 250 which will form the insulation 208 of FIG. 26. In order to assure that the mesh 210 remains properly located within the laminated structure, it may be desirable to tack the mesh 210 in place on, for example, the central thermoplastic sheet 250.

Figure 34:
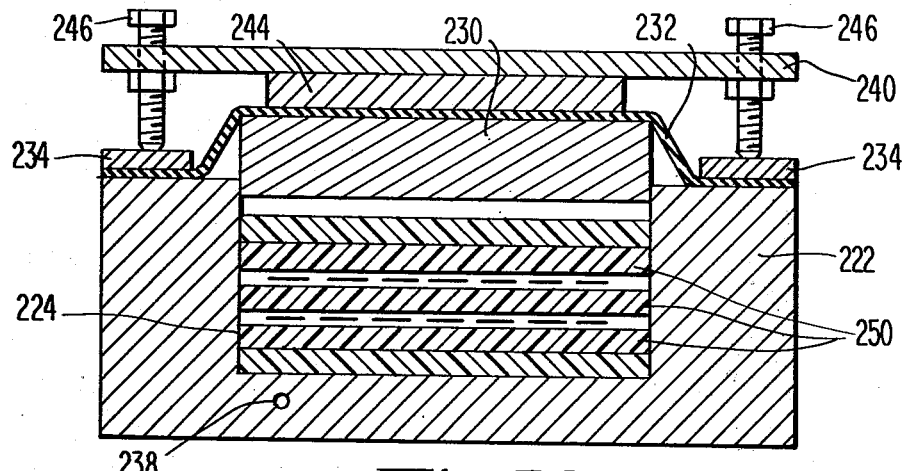
FIG. 34 represents a second step in a method of utilizing the apparatus of FIG. 32.

As shown in FIG. 34, the gasket 232 is sealingly applied to the top of the base 222 so as to define a substantially airtight chamber within the channel 224. In order to prevent the formation of air bubbles between the components 210 and 250, the bridging member 240 supports the insert 230 by virtue of the bolts 246. The fixture is retained in the condition shown in FIG. 34 until such time as all of the air has been evacuated through the vacuum port 238.

Figure 35:
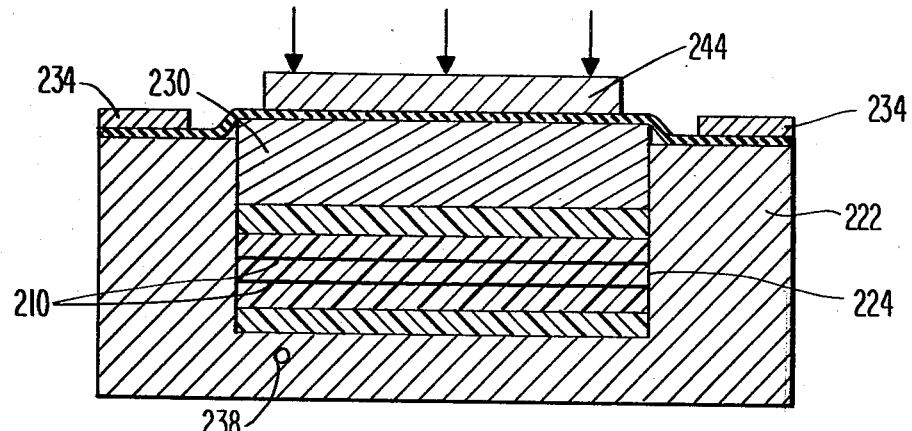
FIG. 35 represents a third step in the method of utilizing the apparatus of FIG. 32.

Once the air has been completely evacuated from the chamber within the channel 224, the bridge 240 is removed and atmospheric pressure forces the elements of the probe to a compressed position as shown in FIG. 35. It is important to note that the pressure applied to the probe elements through the insert 230 occurs prior to any heating of the probe elements. It has been found to be particularly important to apply this pressure prior to heating so that the subsequent relief of internal stress during heating will not cause shrinking and distortion of the plastic. Moreover, it has been found that the very uniform pressure applied to the insert by virtue of atmospheric pressure insures a uniformity throughout the laminate by preventing any swimming of the various mesh electrodes 210. It will of course be appreciated that the probe may be extremely long and this uniformity of pressure would be extremely difficult to achieve by mechanical means. However, by using the fluid pressure provided by the atmosphere, uniformity of pressure is rendered a certainty and a uniformity of the laminate results.

The entire fixture shown in FIG. 35 with atmospheric pressure bearing down on the insert 230 is next inserted into a heated press or oven so as to form a fusion bond of the thermoplastic sheets through the openings in the mesh electrodes 210. The temperature of the oven or press should assure that the thermoplastic sheets 250 reach a temperature at least equal to the melting point of the thermoplastic sheets. In the case of Kynar sheets 250, a temperature of 370° F. is sufficient to form a fusion bond through the openings in the mesh electrodes 210. Such a temperature is below the 550° melting point of FEP so as to permit the use of FEP as the pads 228. On the other hand, if FEP is utilized as the thermoplastic sheet material, the temperature of the sheets must equal or exceed 550° F. and the pads 228 must comprise another highly polished surface such as stainless steel.

Figure 36:
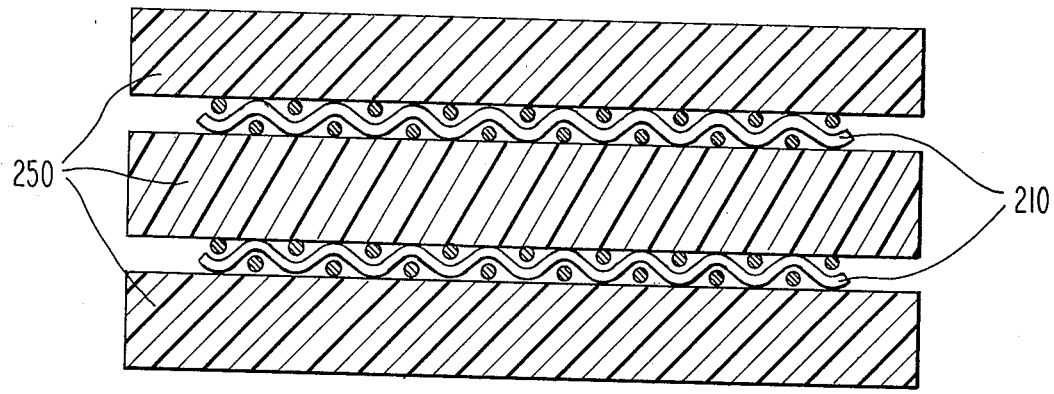
FIG. 36 depicts the relationship of the probe elements in the step shown in FIG. 33.
Figure 37:
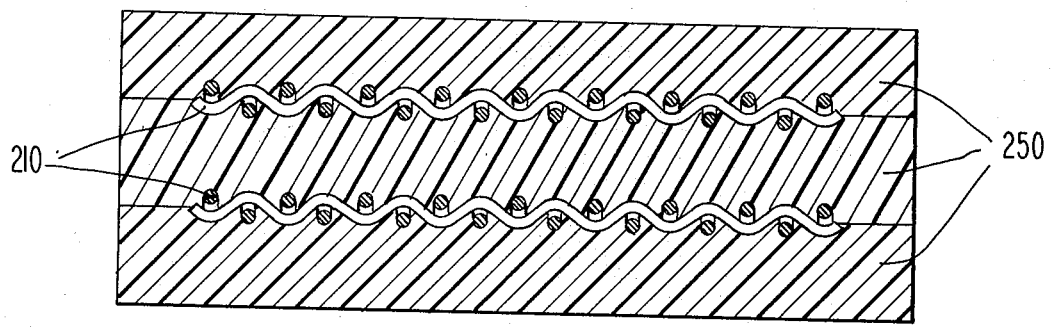
FIG. 37 depicts the relationship of the elements in the step shown in FIG. 34.
Figure 38:
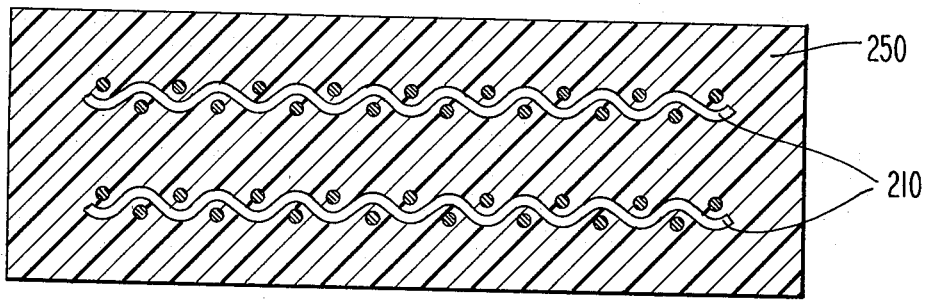
FIG. 38 depicts the relationship of the elements after the application of heat.

In FIG. 36, the sheets of thermoplastic material 250 and the mesh electrodes 210 are shown as spaced apart by air as in the case of FIG. 33. In FIG. 37, the air has been evacuated and pressure has been applied corresponding generally with FIG. 35. In FIG. 38, heat has been applied to structure so as to form a fusion bond through the openings in the electrodes 210 thus assuring the mechanical grip on the strands in the wire mesh.

By utilizing the foregoing technique for laminating probes, it has been found that the resulting probes are particularly resistant to delamination. Even when the probe is inserted into water at relatively high temperatures, the probe resists any delamination which might otherwise result due to the collection of water in air pockets adjacent to the probe electrodes. In this connection, it is important to note that the liquid in which the probe is inserted must have a temperature of less than the melting temperature of insulation. It is therefore important to employ thermoplastic which melt at temperatures no lower than 120° F. which represents the maximum ambient temperature a probe is likely to encounter and preferably in excess of 212° F., the boiling point of water. In other words, the melting temperature of the insulation material should be higher than the temperature of the liquid in which the probe is immersed.

Figure 39:
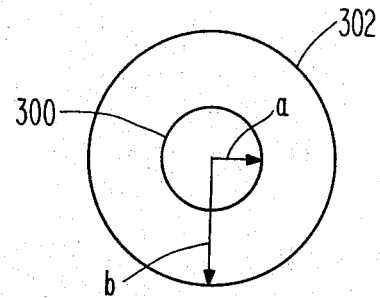
FIG. 39 is a schematic representation of an insulated electrode filament utilized to explain the invention.

The manner in which the compressive forces are developed around the probe electrodes will now be described with reference to FIG. 39 which represents a filament 300 of a wire mesh electrode surrounded by insulation 302 where a represents the internal radius of the insulation 302 and b represents the external radius of the insulation 302.

Assume the following:
P = internal radial pressure in psi (longitudinal pressure = 0)
Δa = change in internal radius due to P
Δb = change in external radius due to P
E = modulus of elasticity; and
ν = Poisson's ratio For the model shown in FIG. 39:

$$\Delta a = P \frac{a}{E} \left( \frac{b^2 + a^2}{b^2 - a^2} + \nu \right) \quad (1)$$

$$\Delta b = P \frac{b}{E} \left( \frac{2a^2}{b^2 - a^2} \right) \quad (2)$$

$$P = \frac{\Delta a}{\frac{a}{E} \left( \frac{b^2 + a^2}{b^2 - a^2} + \nu \right)} \quad (3)$$

$$P = \frac{\Delta a \, E}{a \left( \frac{b^2 + a^2}{b^2 - a^2} + \nu \right)} \quad (4)$$

It is believed that the model expressed by Equation (4) represents the pressure which is applied to the wire 300 as the insulation 302 shrinks around the filament 300. It will be noted that Poisson's ratio ν may be expressed by the equation $$\nu = \left( \frac{E - 2G}{2G} \right) \quad (5)$$

where G = the modulus of elasticity in shear. Poisson's ratio ν may also be expressed as $$\nu = \frac{3K - E}{6K} \quad (6)$$

where K = the bulk modulus of elasticity. It will therefore be understood that the denominator of Equation (4) is a constant and the pressure exerted on the wire 302 is therefore a function of the product of shrinkage Δa at the internal radius of the insulation 302 and the modulus of elasticity of the insulation E.

Figure 40:
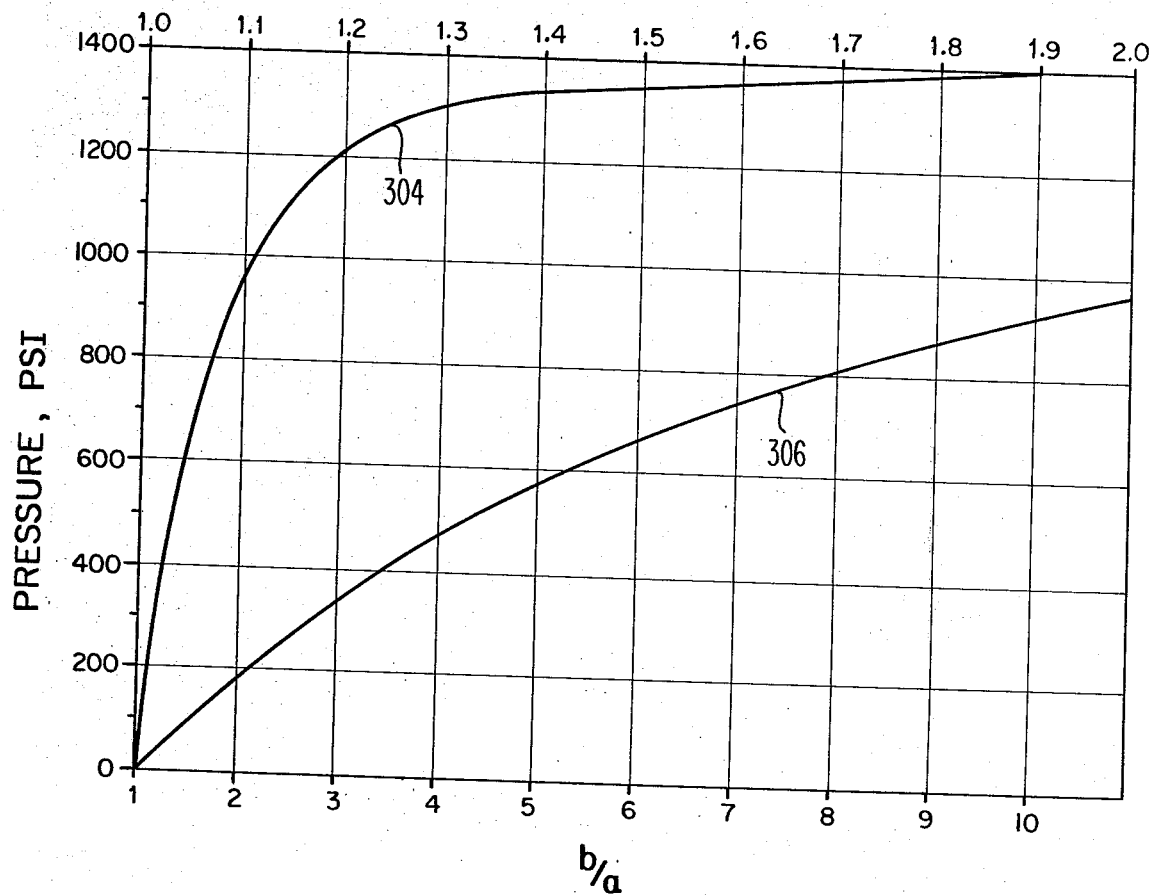
FIG. 40 is a graph depicting pressures generated on the filament of FIG. 39 under various conditions.

Reference will now be made to FIG. 40 wherein the pressure P exerted on the wire 300 by Kynar insulation 302 is depicted assuming a specific shrinkage of approximately 1.5%. The upper curve 304 of the graph shows that the pressure increases almost linearly as the insulation becomes larger but begins to reach a limiting value as the ratio of b/a is about 4. In other words, from a pressure standpoint, it would not help to have the insulation thicker than approximately 3 times the radius of the wire or one and one-half times the diameter of the wire. However, the lower curve 306 of the graph clearly indicates that increases in ratio of b/a up to 2 produces very substantial increases in the pressure applied to the wire 300 by the insulation 302.

The model for the round wire therefore shows that any thickness of insulation will produce positive pressure on the wire as long as there is some shrinkage of the insulation. However, since many thermoplastic materials which are particularly suitable for use as the insulation 302 will relax after initial tension, a sufficient amount of pressure must be applied initially so as to assure adequate pressure and grip on the wire 300 even after relaxation.

Figure 41:
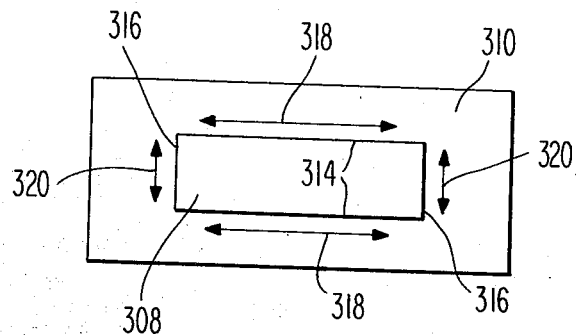
FIG. 41 is a schematic representation of an insulated section of a planar electrode utilized to explain the invention.

Referring to FIG. 41, consideration will now be given to sheet-like conductive electrodes having openings etched therein so as to leave any electrode portion 308 which is substantially rectangular in cross-section and surrounded by insulation material 310. The pressure exerted on the electrode portion 308 which is a function of insulation thickness is different from the case with a round wire because of the rectangular nature of the electrode portion 308. More particularly, the metal electrode 308 will prevent any substantial movement at the corners 312 of the electrode and place the insulation materials 310 in lateral tension along surfaces 314 and 316 as depicted by arrows 318 and 320 respectively. Because of the lateral tension depicted by the arrows 318 and 320, the insulation 310 will resist any deflection required to exert pressure on the metal electrode surfaces 314 and 316. For very thin insulation, the pressure in the radial direction is not high enough to deflect the insulation because it is in lateral tension. As a result there is essentially no pressure on the flat surfaces of the electrode 308. As the insulation thickness increases, the radial pressure becomes high and eventually is enough to overcome the effects of the insulation being in tension and the pressure is transferred to the surfaces 314 and 316 of the electrode 308.

It will be understood that the probes shown in FIGS. 26 and 29 may be utilized in conjunction with the circuitry disclosed in FIGS. 22 and 23. Indeed, it is intended that the unknown capacitance 136 represents the capacitance from the probe electrode 200 of the probe shown in FIG. 26 and ground or the capacitance between the probe electrode 216 of the probe shown in FIG. 29 and ground.

It will also be understood that various insulation materials may be utilized which are characterized by shrinkage as they solidify.

Although specific embodiments of the invention have been shown and described and certain modifications suggested, it will be understood that other modifications may be made without departing from the true spirit and scope of the invention as set forth in the appended claims.

What is claimed is:

1. An RF probe for measuring liquid levels made by an improved method comprising the following steps:
    applying sheets of thermoplastic insulation material to the exterior of a probe electrode comprising a wire mesh having a plurality of openings extending therethrough such that said sheets extend substantially laterally outwardly beyond the lateralmost extremities of said probe electrode and beyond the end of said probe electrode;
    locating the sheets and electrode within an air tight chamber having a diaphragm pressing member;
    substantially evacuating said chamber of air including any air present between said sheets and within said openings and beyond said lateralmost extremities before applying uniform pressure to said sheets;
    subsequently applying uniform pressure through said diaphragm to said sheets after said air has been evacuated from between said sheets; and
    heating said insulation material to at least its melting point so as to form a fusion bond between said sheets through said openings and beyond said lateralmost extremities whereby substantial compressive forces are applied to said probe electrode over the surface area thereof upon cooling, the insulation material forming a continuum through said openings and said lateralmost extremities.

2. The product of claim 1 wherein said thermoplastic has a melting point in excess of 100° F.

3. The product of claim 1 wherein said thermoplastic has a melting point in excess of 212° F.

4. In a method of making an RF probe for measuring liquid levels, the improvement comprising the following steps:
    applying sheets of thermoplastic insulation material to the exterior of a probe electrode comprising a wire mesh having a plurality of openings extending therethrough such that said sheets extend substantially laterally outwardly beyond the lateralmost extremities of said probe electrode and beyond one end of said probe electrode, said openings having rounded walls;
    locating the sheets and electrode within an air tight chamber having a diaphragm pressing member;
    evacuating said chamber including any air present between said sheets and within said openings and beyond said lateralmost extremities before applying uniform pressure to said sheets;
    subsequently applying uniform pressure through said diaphragm to said sheets after said air has been evacuated from between said sheets; and
    heating said insulation material to at least its melting point so as to form a fusion bond between said sheets through said openings and beyond said lateralmost extremities and said one end whereby substantial compressive forces are applied to said probe electrode over the surface area thereof upon cooling, the insulation material forming a continuum through said openings.

5. The method of claim 4 wherein said openings are formed by etching.

6. The method of claim 4 wherein said probe electrode comprises a wire mesh and wherein said wires have substantially circular cross-sections.

7. In a method of making an RF probe for measuring liquid levels, the improvement comprising the following steps:
    applying sheets of thermoplastic insulation material to the exterior of a probe electrode having a plurality of openings extending therethrough such that said sheets extend substantially laterally outwardly beyond the lateralmost extremities of said probe electrode and beyond the end of said probe electrode;
    locating the sheets and electrode within an air tight chamber having a diaphragm pressing member;
    evacuating said chamber including any air present between said sheets within said openings and beyond said lateralmost extremities while restraining said pressing member;
    applying uniform pressure through said compressing member after evacuating and without restraint; and
    heating said insulation material to at least its melting point so as to form a fusion bond between said sheets through said openings and beyond said lateralmost extremities whereby substantial compressive forces are applied to said probe electrode over the surface area thereof upon cooling, the insulation material forming a continuum through said openings and said lateralmost extremities.

8. The method of claim 7 wherein said thermoplastic has a melting point in excess of 100° F.

9. The method of claim 7 wherein said thermoplastic has a melting point in excess of 212° F.

10. The method of claim 7 further comprising the step of uniformly applying pressure to said sheets so as to compress said sheets toward said probe electrode.

11. The method of claim 10 wherein the air between the insulation material and the probe electrode is evacuated prior to applying pressure to the insulation material.

12. The method of claim 10 wherein said step of applying pressure to the insulation material comprises and applying fluid pressure to the sides of the insulation material facing away from the electrode.

13. The method of claim 12 wherein pressure is applied to the insulation material prior to heating to the melting point thereof.

14. The RF probe made by any of claims 7, 8, 9, 10, 12, 11, 13, 4, 5 or 6.

* * * * *